United States Patent
Chen

(10) Patent No.: US 10,516,292 B2
(45) Date of Patent: *Dec. 24, 2019

(54) TWO-LEVEL LED SECURITY LIGHT WITH MOTION SENSOR

(71) Applicant: VAXCEL INTERNATIONAL CO., LTD., Carol Stream, IL (US)

(72) Inventor: Chia-Teh Chen, Taipei (TW)

(73) Assignee: Vaxcel International Co., Ltd., Carol Stream, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,671

(22) Filed: Jan. 10, 2019

(65) Prior Publication Data

US 2019/0150245 A1 May 16, 2019

Related U.S. Application Data

(60) Continuation of application No. 15/896,403, filed on Feb. 14, 2018, now Pat. No. 10,225,902, which is a
(Continued)

(51) Int. Cl.
*H05B 37/02* (2006.01)
*H02J 7/35* (2006.01)
(Continued)

(52) U.S. Cl.
CPC .................... *H02J 7/35* (2013.01); *F21S 9/03* (2013.01); *F21V 17/02* (2013.01); *G08B 5/36* (2013.01); *G08B 13/1895* (2013.01); *G08B 15/00* (2013.01); *G08B 15/002* (2013.01); *H05B 33/083* (2013.01); *H05B 33/0809* (2013.01); *H05B 33/0815* (2013.01); *H05B 33/0818* (2013.01); *H05B 33/0824* (2013.01);
(Continued)

(58) Field of Classification Search
CPC ............ H05B 37/0218; H05B 37/0227; H05B 37/0281; H05B 37/0272; H05B 33/0815; H05B 33/0824; H05B 33/083; H05B 33/0845; H05B 33/0854; H05B 33/0872
USPC ................ 315/149, 152, 154, 307, 308, 312
See application file for complete search history.

(56) References Cited

U.S. PATENT DOCUMENTS 5,134,387 A 7/1992 Smith et al.
5,598,066 A 1/1997 Wiesemann et al.
(Continued)

*Primary Examiner* — Tung X Le
(74) *Attorney, Agent, or Firm* — Rosenberg, Klein & Lee

(57) ABSTRACT

A lifestyle LED security light including a light-emitting unit configured with two sets of LED loads respectively emitting different color temperature lights is disclosed. At dusk the light-emitting unit is automatically turned on for a first level illumination with a low color temperature light featuring an aesthetic night view with the motion sensor being deactivated for a time duration, and then the light emitting unit is changed to a second level illumination and at the same time the motion sensor is activated, wherein when the motion sensor detects a motion intrusion, the light-emitting unit is instantly switched to perform a third level illumination with a a high light intensity and a high color temperature light. The color temperatures of the first level illumination and the third level illumination are respectively adjustable by simultaneously and reversely adjusting the electric powers respectively allocated to the two sets of LED loads.

89 Claims, 18 Drawing Sheets

Related U.S. Application Data continuation of application No. 15/785,658, filed on Oct. 17, 2017, now Pat. No. 10,326,301, which is a continuation of application No. 15/375,777, filed on Dec. 12, 2016, now Pat. No. 9,826,590, which is a continuation of application No. 14/836,000, filed on Aug. 26, 2015, now Pat. No. 9,622,325, which is a division of application No. 14/478,150, filed on Sep. 5, 2014, now Pat. No. 9,445,474, which is a continuation of application No. 13/222,090, filed on Aug. 31, 2011, now Pat. No. 8,866,392.

(51) Int. Cl.
　　*H05B 33/08* (2006.01)
　　*G08B 15/00* (2006.01)
　　*H05B 39/04* (2006.01)
　　*F21S 9/03* (2006.01)
　　*F21V 17/02* (2006.01)
　　*G08B 5/36* (2006.01)
　　*G08B 13/189* (2006.01)
　　*F21Y 115/10* (2016.01)
　　*G08B 13/00* (2006.01)

(52) U.S. Cl.
　　CPC ..... *H05B 33/0827* (2013.01); *H05B 33/0854* (2013.01); *H05B 33/0872* (2013.01); *H05B 37/02* (2013.01); *H05B 37/0218* (2013.01); *H05B 37/0227* (2013.01); *H05B 37/0281* (2013.01); *H05B 39/042* (2013.01); *H05B 39/044* (2013.01); *F21Y 2115/10* (2016.08); *G08B 13/00* (2013.01); *G08B 13/189* (2013.01); *Y02B 20/40* (2013.01); *Y02B 20/44* (2013.01); *Y02B 20/46* (2013.01)

(56) References Cited

U.S. PATENT DOCUMENTS

| | | | |
|---|---|---|---|
| 5,747,937 A | 5/1998 | Wiesemann et al. | |
| 6,016,038 A | 1/2000 | Mueller et al. | |
| 6,211,626 B1 | 4/2001 | Lys et al. | |
| 6,225,748 B1 | 5/2001 | Evans et al. | |
| 6,548,967 B1 | 4/2003 | Dowling et al. | |
| 6,888,323 B1 | 5/2005 | Null et al. | |
| 6,909,239 B2 | 6/2005 | Gauna | |
| 6,927,541 B2 | 8/2005 | Lee | |
| 7,086,756 B2 | 8/2006 | Maxik | |
| 7,088,059 B2 | 8/2006 | McKinney et al. | |
| 7,122,976 B1 | 10/2006 | Null et al. | |
| 7,268,497 B2 | 9/2007 | Hsieh | |
| 7,344,275 B2 | 3/2008 | Allen et al. | |
| 7,405,524 B2 | 7/2008 | Null et al. | |
| 7,564,198 B2 | 7/2009 | Yamamoto et al. | |
| 7,804,252 B2 | 9/2010 | Chen | |
| 8,159,125 B2 | 4/2012 | Miao | |
| 8,194,061 B2 | 6/2012 | Wang et al. | |
| 8,203,260 B2* | 6/2012 | Li | H05B 33/086 313/502 |
| 8,310,163 B2 | 11/2012 | Chen | |
| 8,476,836 B2 | 7/2013 | Van De Ven et al. | |
| 8,598,805 B2 | 12/2013 | Tremblay et al. | |
| 9,014,829 B2* | 4/2015 | Chemel | F21V 23/0471 700/90 |
| 9,271,345 B2 | 2/2016 | Welten | |
| 9,345,112 B2 | 5/2016 | Chen | |
| 9,497,834 B2 | 11/2016 | Chen | |
| 9,795,008 B2 | 10/2017 | Chen | |
| 2005/0007025 A1 | 1/2005 | Gauna | |
| 2005/0259416 A1 | 11/2005 | Gauna et al. | |
| 2006/0022916 A1 | 2/2006 | Aiello | |
| 2007/0182338 A1 | 8/2007 | Shteynberg et al. | |
| 2008/0197783 A1 | 8/2008 | Chen | |
| 2009/0033243 A1* | 2/2009 | Gater | H05B 33/0827 315/291 |
| 2010/0013409 A1* | 1/2010 | Quek | H05B 33/0815 315/294 |
| 2010/0201267 A1* | 8/2010 | Bourquin | H05B 37/0227 315/32 |
| 2014/0062313 A1 | 3/2014 | Ootsubo et al. | |
| 2014/0210362 A1 | 7/2014 | Shin et al. | |
| 2015/0289339 A1 | 10/2015 | Wu et al. | |

* cited by examiner

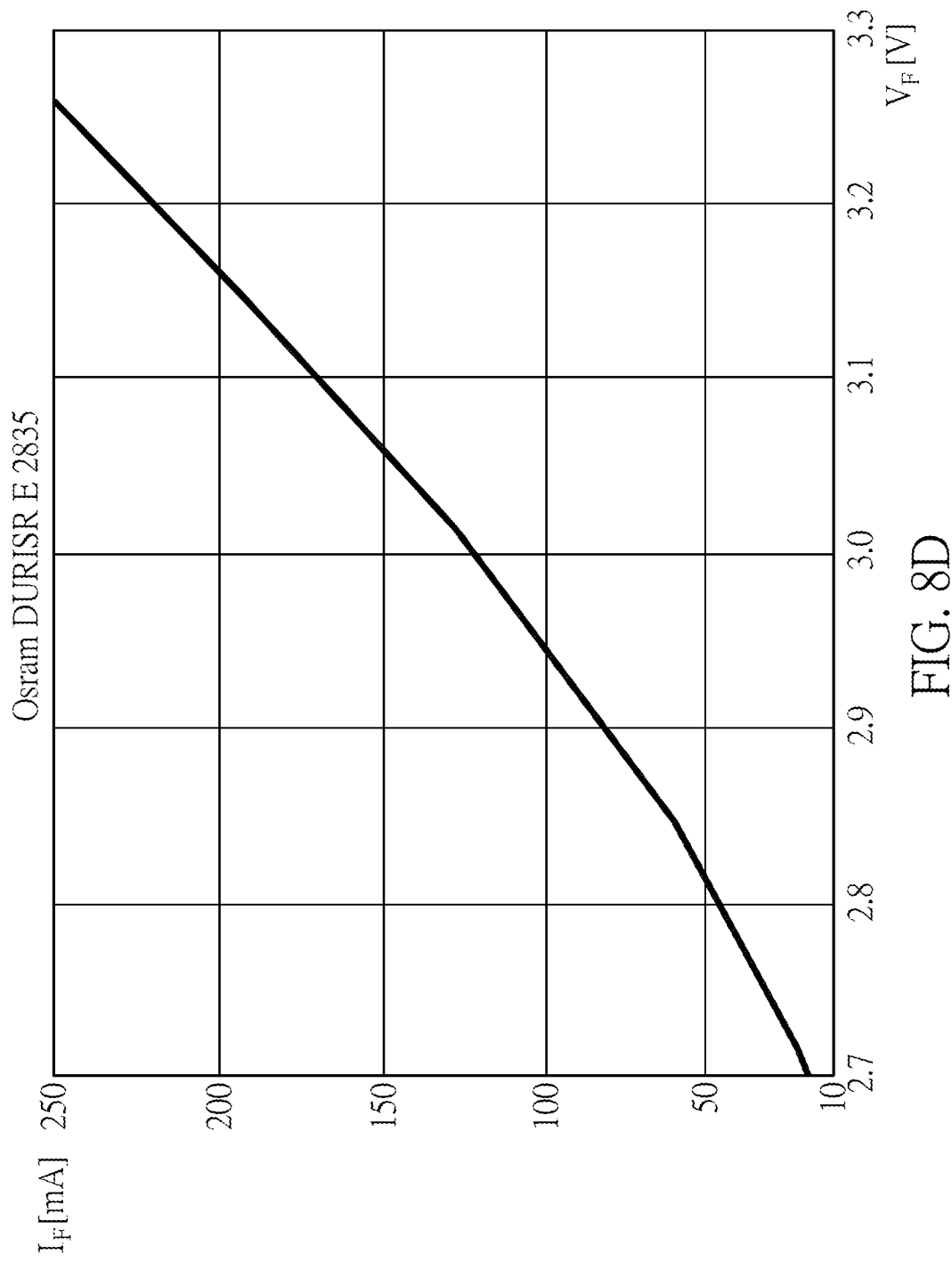

| Brand | $V_F$ Min. | $V_F$ Max. | Product Series | Information Source |
|---|---|---|---|---|
| CREE | 2.9V | 3.3V | J Series LEDs/J Series 2835 | www.cree.com/led-components/products/j2835/jseries-2835 |
| LUMILEDS | 2.7V | 3.3V | LUXEON 2835 Line | www.lumileds.com/luxeon2835line |
| SAMSUNG | 2.9V | 3.3V | KM281BA+ | www.samsung.com/app/components/products/j2835/jseries-2835 |
| OSRAM | 2.7V | 3.3V | DURIS® E/DURISR E 2835 | www.osram.com/app/product_selector/#!?query=DORIS%20E%202835&sortField=&sortOrder=&start-0&filters=productbrand,DORIS,E&filters-productbrand,DORIS |

FIG. 9

TWO-LEVEL LED SECURITY LIGHT WITH MOTION SENSOR

CROSS-REFERENCE TO RELATED APPLICATION

This is a continuation application of prior application Ser. No. 15/896,403, filed on 14 Feb. 2018, currently pending. Ser. No. 15/896,403 is a continuation application of prior application Ser. No. 15/785,658, filed on 17 Oct. 2017, currently pending. Ser. No. 15/785,658 is a continuation application of prior application Ser. No. 15/375,777 filed on 12 Dec. 2016, which issued as U.S. Pat. No. 9,826,590. U.S. Pat. No. 9,826,590 is a continuation application of prior application Ser. No. 14/836,000 filed on 26 Aug. 2015, which issued as U.S. Pat. No. 9,622,325, and which is a divisional application of Ser. No. 14/478,150, filed on 5 Sep. 2014, issued as U.S. Pat. No. 9,445,474, which is a continuation application of Ser. No. 13/222,090, filed 31 Aug. 2011, which issued as U.S. Pat. No. 8,866,392 on 21 Oct. 2014.

BACKGROUND OF THE INVENTION

1. Technical Field

The present disclosure relates to a lighting apparatus, in particular, to a two-level security LED light with motion sensor

2. Description of Related Art

Lighting sources such as the fluorescent lamps, the incandescent lamps, the halogen lamps, and the light-emitting diodes (LED) are commonly found in lighting apparatuses for illumination purpose. Photoresistors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a high level illumination for a predetermined duration, referred as the Power-Saving (PS) mode. Motion sensors are often used in the lighting apparatus for delivering full-power illumination thereof for a short duration when a human motion is detected, then switching back to the PS mode. Illumination operation controls such as auto-illumination in accordance to the background brightness detection, illumination using timer, illumination operation control using motion sensing results (e.g., dark or low luminous power to fully illuminated), and brightness control are often implemented by complex circuitries. In particular, the design and construction of LED drivers are still of a complex technology with high fabrication cost.

Therefore, how to develop a simple and effective design method on illumination controls such as enhancing contrast in illumination and color temperature for various types lighting sources, especially the controls for LEDs are the topics of the present disclosure.

SUMMARY OF THE INVENTION

An exemplary embodiment of the present disclosure provides a two-level LED security light with motion sensor which may switch to high level illumination in the Power-Saving (PS) mode for a predetermined duration time when a human motion is detected thereby achieve warning purpose using method of electric current or lighting load adjustment. Furthermore, prior to the detection of an intrusion, the LED security light may be constantly in the low level illumination to save energy.

An exemplary embodiment of the present disclosure provides a two-level LED security light including a power supply unit, a light sensing control unit, a motion sensing unit, a loading and power control unit, and a light-emitting unit. The light-emitting unit further includes one or a plurality of series-connected LEDs; when the light sensing control unit detects that the ambient light is lower than a predetermined value, the loading and power control unit turns on the light-emitting unit to generate a high level or a low level illumination; when the light sensing control unit detects that the ambient light is higher than the predetermined value, the loading and power control unit turns off the light-emitting unit; when the motion sensing unit detects a human motion in the PS mode, the loading and power control unit increases the electric current that flows through the light-emitting unit so as to generate the high level illumination for a predetermined duration.

Another exemplary embodiment of the present disclosure provides a two-level LED security light including a power supply unit, a light sensing control unit, a motion sensing unit, a loading and power control unit, a light-emitting unit. The light-emitting unit includes a plurality of series-connected LEDs. When the light sensing control unit detects that the ambient light is lower than a predetermined value, the loading and power control unit turns on a portion or all the LEDs of the light-emitting unit to generate a low level or a high level illumination; when the light sensing control unit detects that the ambient light is higher than the predetermined value, the loading and power control unit turns off all the LEDs in the light-emitting unit; when the motion sensing unit detects a human motion in the PS mode, the loading and power control unit turns on a plurality of LEDs in the light-emitting unit and generates the high level illumination for a predetermine duration. An electric current control circuit is integrated in the exemplary embodiment for providing constant electric current to drive the LEDS in the light-emitting unit.

One exemplary embodiment of the present disclosure provides a two-level LED security light including a power supply unit, a light sensing control unit, a motion sensing unit, a loading and power control unit, and a light-emitting unit. The light-emitting unit includes a phase controller and one or a plurality of parallel-connected alternating current (AC) LEDs. The phase controller is coupled between the described one or a plurality parallel-connected ACLEDs and AC power source. The loading and power control unit may through the phase controller control the average power of the light-emitting unit; when the light sensing control unit detects that the ambient light is lower than a predetermined value, the loading and power control unit turns on the light-emitting unit to generate a high level or a lower level illumination; when the light sensing control unit detects that the ambient light is higher than the predetermined value, the loading and power control unit turns off the light-emitting unit; when the motion sensing unit detects a human motion in the PS mode, the loading and power control unit increases the average power of the light-emitting unit thereby generates the high level illumination for a predetermine duration.

According to an exemplary embodiment of the present disclosure, a two-level LED security light includes a power supply unit, a light sensing control unit, a motion sensing unit, a loading and power control unit, and a light-emitting unit. The light-emitting unit includes X high wattage ACLEDs and Y low wattage ACLEDs connected in parallel. When the light sensing control unit detects that the ambient light is lower than a predetermined value, the loading and power control unit turns on the plurality of low wattage ACLEDs to generate a low level illumination; when the light sensing control unit detects that the ambient light is higher than a predetermined value, the loading and power control unit turns off the light-emitting unit; when the motion sensor detects an intrusion, the loading and power control unit turns on both the high wattage ACLEDs and the low wattage ACLEDs at same time thereby generates a high level illumination for a predetermine duration, wherein X and Y are of positive integers.

According to an exemplary embodiment of the present disclosure, a two-level LED security light with motion sensor includes a power supply unit, a light sensing control unit, a motion sensing unit, a loading and power control unit, and a light-emitting unit. The light-emitting unit includes a rectifier circuit connected between one or a plurality of parallel-connected AC lighting sources and AC power source. The loading and power control unit may through the rectifier circuit adjust the average power of the light-emitting unit. When the light sensing control unit detects that the ambient light is lower than a predetermined value, the loading and power control unit turns on the light-emitting unit to generate a low level illumination; when the light sensing control unit detects that the ambient light is higher than the predetermined value, the loading and power control unit turns off the light-emitting unit; when the motion sensing unit detects an intrusion, the loading and power control unit increases the average power of the light-emitting unit thereby generates a high level illumination for a predetermine duration. The rectifier circuit includes a switch parallel-connected with a diode, wherein the switch is controlled by the loading and power control unit.

To sum up, a two-level LED security light with motion sensor provided by an exemplary embodiment in the preset disclosure, may execute Photo-Control (PC) and Power-Saving (PS) modes. When operates in the PC mode, the lighting apparatus may auto-illuminate at night and auto-turnoff at dawn. The PC mode may generate a high level illumination for a predetermined duration then automatically switch to the PS mode by a control unit to generate a low level illumination. When the motion sensor detects a human motion, the disclosed LED security light may immediate switch to the high level illumination for a short predetermined duration thereby achieve illumination or warning effect. After the short predetermined duration, the LED security light may automatically return to the low level illumination for saving energy.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIGS. 8A, 8B, 8C and 8D schematically and respectively show I-V relationship charts (Forward Current vs. Forward Voltage) for a white LED chip from each of 4 different LED manufacturers.

FIG. 9 is a data sheet showing data of the minimum forward voltages and maximum forward voltages collected from various LED manufacturers.

DETAILED DESCRIPTION OF PREFERRED EMBODIMENTS

Figure 1:
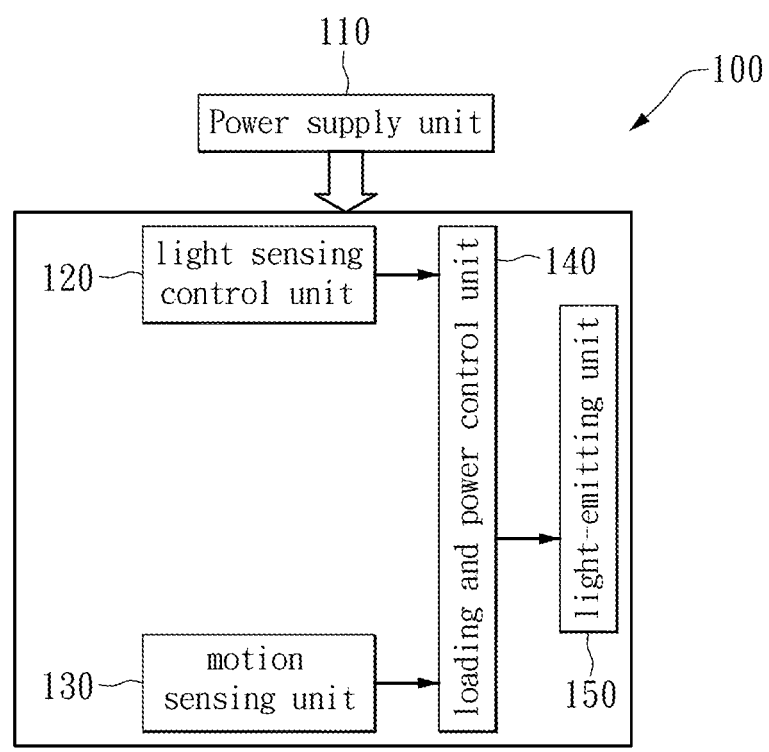
FIG. 1 schematically illustrates a block diagram of a two-level LED security light in accordance with an exemplary embodiment of the present disclosure.
Figure 1A:
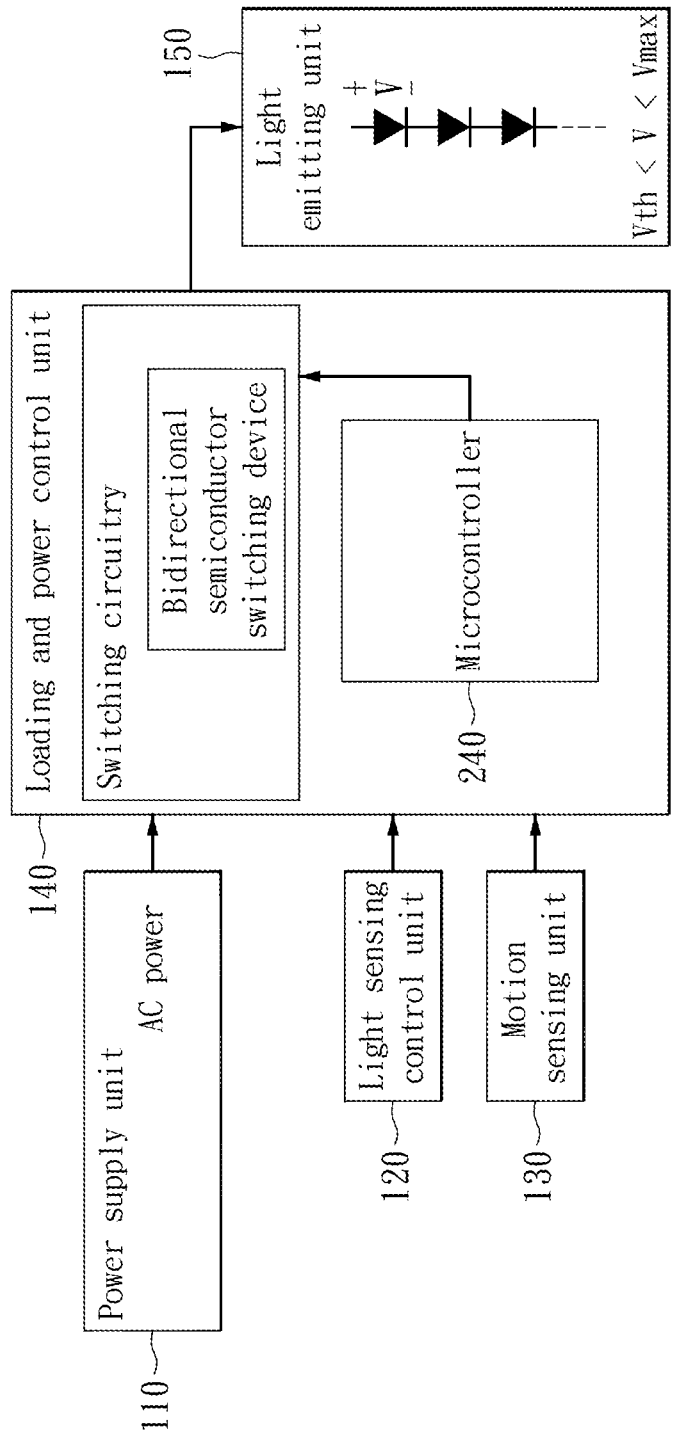
FIG. 1A is an enhanced block diagrammed under FIG. 1 to specifically illustrate an embodiment of FIG. 1 for an AC LED two-level security light, wherein the loading and power comprises a switching circuitry and a microcontroller, wherein the switching circuitry further comprises a bidirectional semiconductor switching device for controlling an average electric power to be delivered to the AC LED.
Figure 1B:
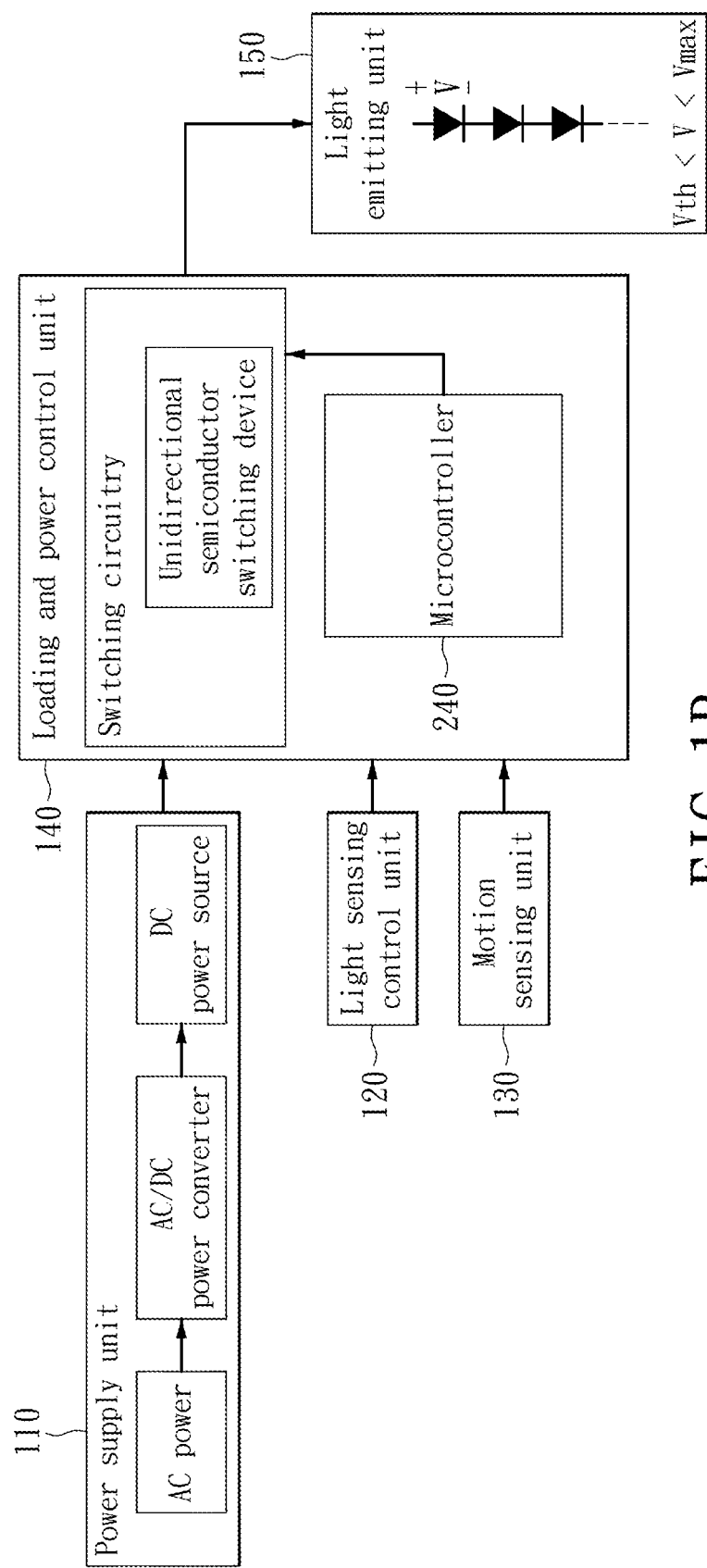
FIG. 1B is an enhanced block diagrammed under FIG. 1 to specifically illustrate an embodiment of FIG. 1 for a DC LED two-level security light, wherein the loading and power control unit comprises a switching circuitry and a microcontroller, wherein the switching circuitry further comprises an unidirectional semiconductor switching device for controlling an average electric power to be delivered to the DC LED.
Figure 1C:
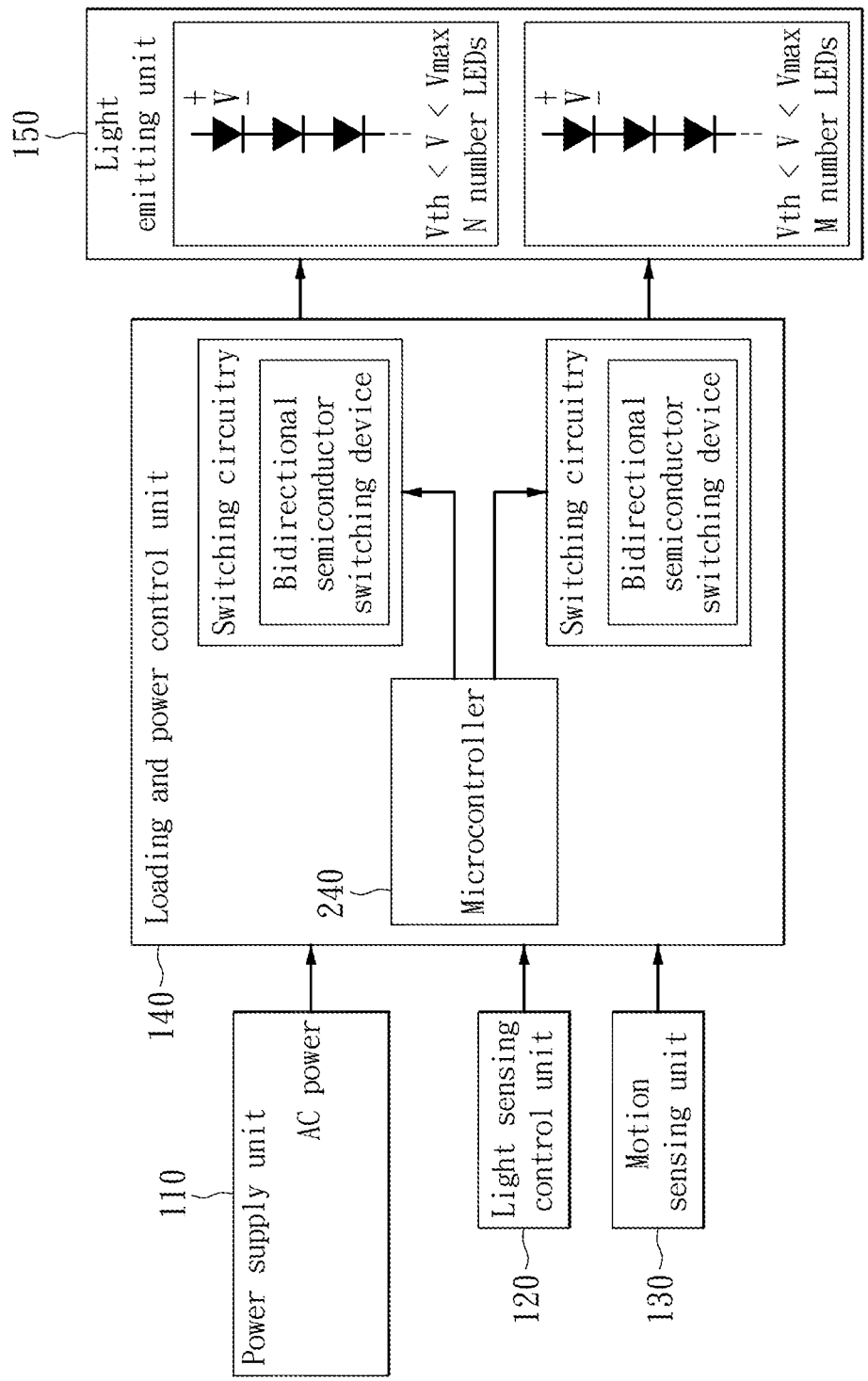
FIG. 1C is an enhanced block diagrammed under FIG. 1 to specifically illustrate an embodiment of FIG. 1 for a AC LED two-level security light including a first set having N number LEDs and a second set having M number LEDs, wherein the loading and power control unit comprises a switching circuitry and a microcontroller, wherein the switching circuitry further comprises bidirectional semiconductor switching devices for controlling an average electric power to be delivered to the AC LED.
Figure 1D:
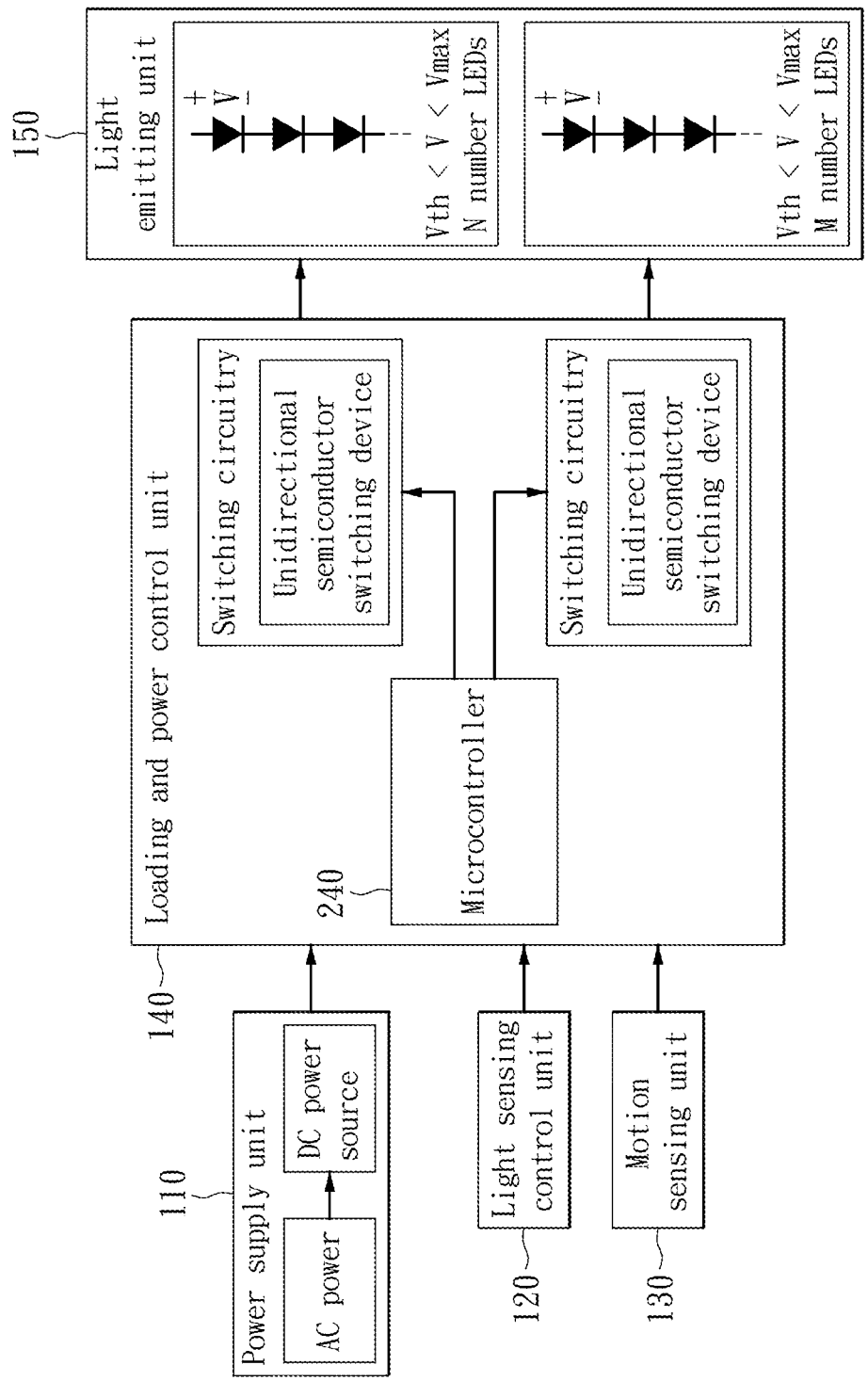
FIG. 1D is an enhanced block diagrammed under FIG. 1 to specifically illustrate an embodiment of FIG. 1 for a DC LED two-level security light including a first set having N number LEDs and a second set having M number LEDs, wherein the loading and power control unit comprises a switching circuitry and a microcontroller, wherein the switching circuitry further comprises unidirectional semiconductor switching devices for controlling an average electric power to be delivered to the DC LED.

Reference is made in detail to the exemplary embodiments of the present disclosure, examples of which are illustrated in the accompanying drawings. Wherever possible, the same reference numbers are used in the drawings and the description to refer to the same or alike parts.

First Exemplary Embodiment

Refer to FIG. 1, which schematically illustrates a block diagram of a two-level LED security light in accordance to the first exemplary embodiment of the present disclosure. A two-level LED security light (herein as the lighting apparatus) 100 includes a power supply unit 110, a light sensing control unit 120, a motion sensing unit 130, a loading and power control unit 140, and a light-emitting unit 150. The power supply unit 110 is used for supplying power required to operate the system, wherein the associated structure includes the known AC/DC voltage converter. The light sensing control unit 120 may be a photoresistor, which may be coupled to the loading and power control unit 140 for determining daytime or nighttime in accordance to the ambient light. The motion sensing unit 130 may be a passive infrared sensor (PIR), which is coupled to the loading and power control unit 140 and is used to detect intrusions. When a person is entering a predetermined detection zone of the motion sensing unit 130, a sensing signal thereof may be transmitted to the loading and power control unit 140.

The loading and power control unit 140 which is coupled to the light-emitting unit 150 may be implemented by a microcontroller. The loading and power control unit 140 may control the illumination levels of the light-emitting unit 150 in accordance to the sensing signal outputted by the light sensing control unit 120 and the motion sensing unit 130. The light-emitting unit 150 may include a plurality of LEDs and switching components. The loading and power control unit 140 may control the light-emitting unit 150 to generate at least two levels of illumination variations.

When the light sensing control unit 120 detects that the ambient light is lower than a predetermined value (i.e., nighttime), the loading and power control unit 140 executes the Photo-Control (PC) mode by turning on the light-emitting unit 150 to generate a high level illumination for a predetermined duration then return to a low level illumination for Power-Saving (PS) mode. When the light sensing control unit 120 detects that the ambient light is higher than a predetermined value (i.e., dawn), the loading and power control unit 140 turns off the light-emitting unit 150. In the PS mode, when the motion sensing unit 130 detects a human motion, the loading and power control unit 140 may increase the electric current which flow through the light-emitting unit 150, to generate the high level illumination for a short predetermined duration. After the short predetermined duration, the loading and power control unit 140 may automatically lower the electric current that flow through the light-emitting unit 150 thus have the light-emitting unit 150 return to low level illumination for saving energy.

Refer to 2A, which illustrates a schematic diagram of a two-level LED security light in accordance to the first exemplary embodiment of the present disclosure. The light sensing control unit 120 may be implemented by a light sensor 220; the motion sensing unit 130 may be implemented by a motion sensor 230; the loading and power control unit 140 may be implemented by a microcontroller 240. The light-emitting unit 250 includes three series-connected LEDs L1~L3. The LEDs L1~L3 is connected between a DC source and a transistor Q1, wherein the DC source may be provided by the power supply unit 110. The transistor Q1 may be an N-channel metal-oxide-semiconductor field-effect-transistor (NMOS). The transistor Q1 is connected between the three series-connected LEDs L1~L3 and a ground GND. The loading and power control unit 140 implemented by the microcontroller 240 may output a pulse width modulation (PWM) signal to the gate of transistor Q1 to control the average electric current. It is worth to note that the electric components depicted in FIG. 2A only serves as an illustration for the exemplary embodiment of the present disclose and hence the present disclosure is not limited thereto.

Figure 2A:
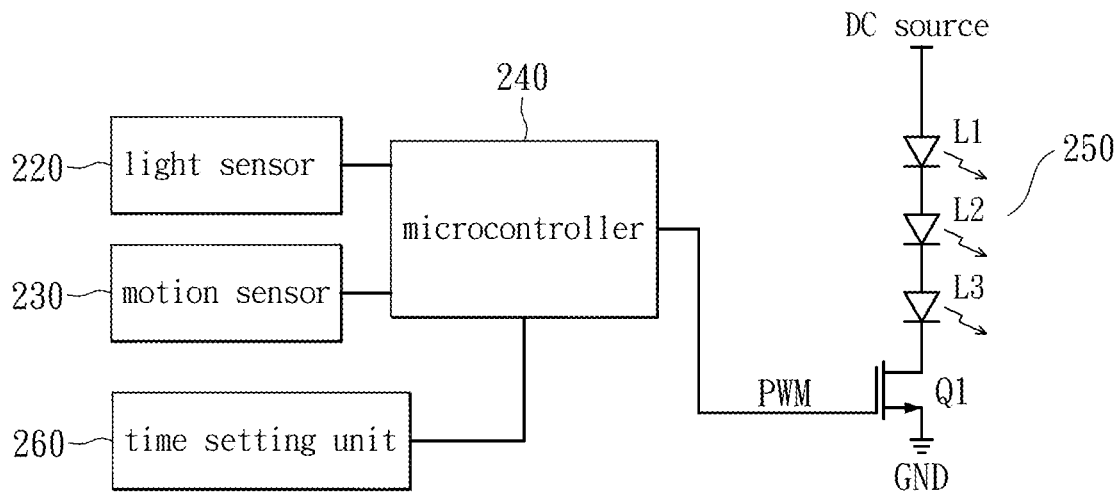
FIG. 2A illustrates a schematic diagram of a two-level LED security light in accordance to the first exemplary embodiment of the present disclosure.
Figure 2B:
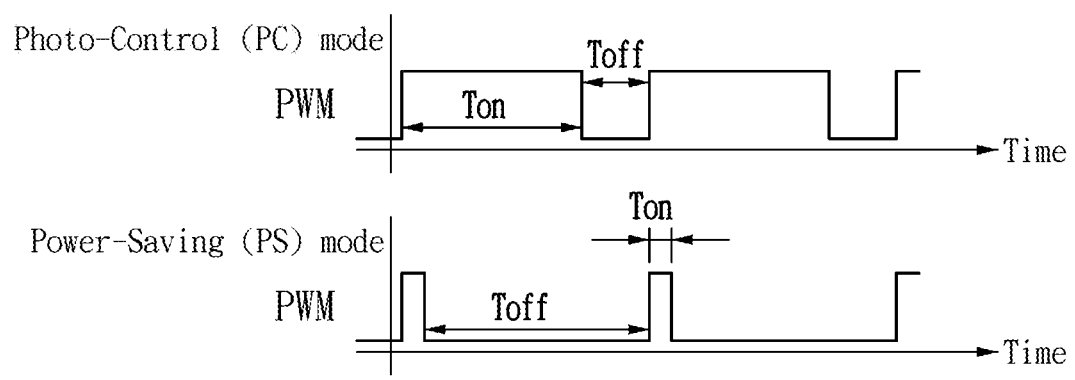
FIG. 2B graphically illustrates a timing waveform of a pulse width modulation (PWM) signal in accordance to the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{on}$ being longer than the cut-off period $T_{off}$. On the other hand in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light-emitting unit 250 thereby generate high illumination, which may be classified as the high level illumination; whereas as the conduction period $T_{on}$ of transistor Q1 is shorter in the PS mode, therefore have lower average electric current driving the light-emitting unit 250 thereby generate low illumination, which may be classified as the low level illumination.

The microcontroller 240 turns off the light-emitting unit 250 during the day and activates the PC mode at night by turning on the light-emitting unit 250 to generate the high level illumination for a short predetermined duration then return to the low level illumination thereby entering the PS mode. When the motion sensor 230 detects a human motion in the PS mode, the light-emitting unit 250 may switch to the high level illumination for illumination or warning application. The light-emitting unit 250 may return to the low level illumination after maintaining at the high level illumination for a short predetermined duration to save energy.

In addition, the microcontroller 240 is coupled to a time setting unit 260, wherein the time setting unit 260 may allow the user to configure the predetermined duration associated with the high level illumination in the PC mode, however the present disclosure is not limited thereto. The time setting unit is a type of external control units designed to detect various external control signals and to convert the various external control signals into various message signals interpretable by the controller for setting various operating parameters of a security light including at least a time length setting for various illumination modes, a light intensity setting for various illumination modes and switching between illumination modes. The external control units may be configured with a push button, a touch sensor, a voltage divider, a power interruption detection circuitry or a wireless remote control receiver for generating message signals interpretable by the controller.

Second Exemplary Embodiment

Refer again to FIG. 1, wherein the illumination variations of the light-emitting unit 150 may be implemented through the number of light-source loads being turned on to generate more than two levels of illumination. The lighting apparatus 100 in the instant exemplary embodiment may be through turning on a portion of LEDs or all the LEDs to generate a low and a high level of illuminations.

Figure 3A:
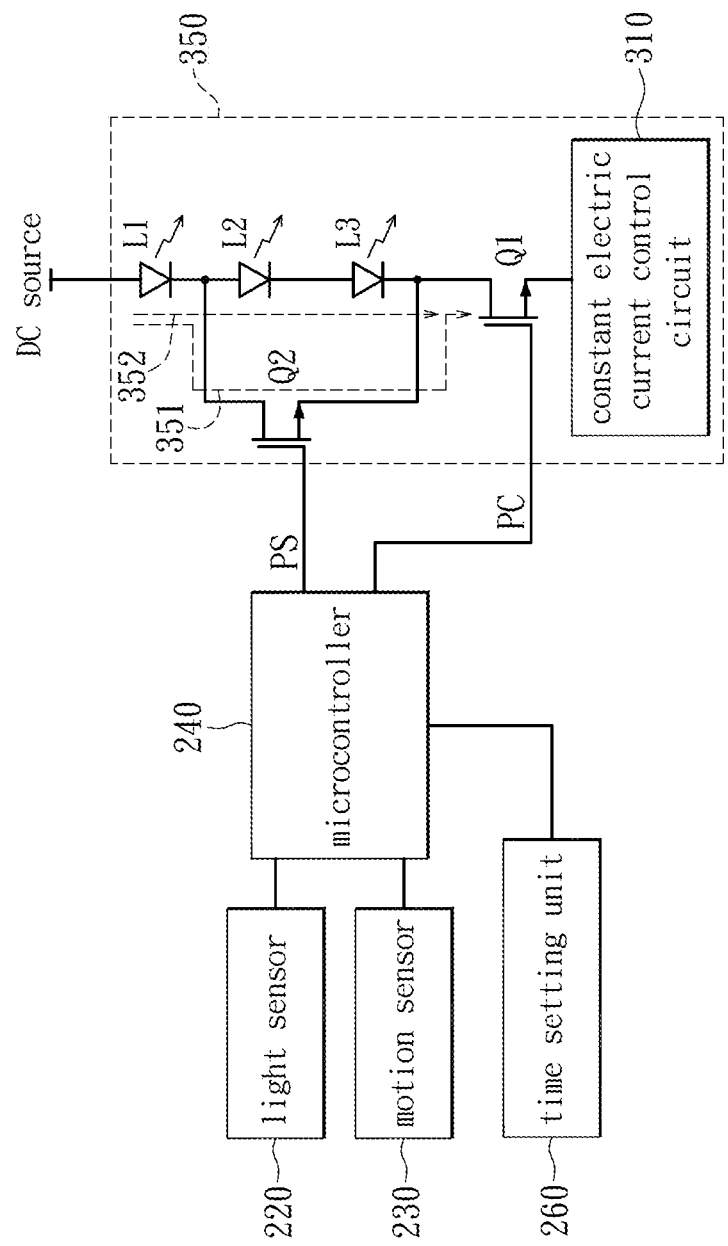
FIG. 3A illustrates a schematic diagram of a two-level LED security light in accordance to the second exemplary embodiment of the present disclosure.

Refer to FIG. 3A concurrently, which illustrates a schematic diagram of a two-level LED security light 100 in accordance to the second exemplary embodiment of the present disclosure. The main difference between FIG. 3A and FIG. 2A is in the light-emitting unit 350, having three series-connected LEDs L1~L3 and NMOS transistors Q1 and Q2. The LEDs L1~L3 are series connected to the transistor Q1 at same time connected between the DC source and a constant electric current control circuit 310. Moreover, transistor Q2 is parallel connected to the two ends associated with LEDs L2 and L3. The gates of the transistors Q1 and Q2 are connected respectively to a pin PC and a pin PS of the microcontroller 240. The constant electric current control circuit 310 in the instant exemplary embodiment maintains the electric current in the activated LED at a constant value, namely, the LEDs L1~L3 are operated in constant-current mode.

Refer to FIG. 3A, the pin PC of the microcontroller 240 controls the switching operations of the transistor Q1; when the voltage level of pin PC being either a high voltage or a low voltage, the transistor Q1 may conduct or cut-off, respectively, to turn the LEDs L1~L3 on or off. The pin PS of the microcontroller 240 controls the switch operations of the transistor Q2, to form two current paths 351 and 352 on the light-emitting unit 350. When the voltage at the pin PS of the microcontroller 240 is high, the transistor Q2 conducts, thereby forming the current path 351 passing through the LED L1 and the transistor Q2; when the voltage at the pin PS being low, the transistor Q2 cuts-off, thereby forming the current path 352 passing through all the LEDs L1~L3. The microcontroller 240 may then control the switching operation of the transistor Q2 to turn on the desired number of LEDs so as to generate a high or a low level illumination.

When light sensor 220 detects that the ambient light is higher than a predetermined value, the microcontroller 240 through the pin PC outputs a low voltage, which causes the transistor Q1 to cut-off and turns off all the LEDs L1~L3 in the light-emitting unit 350. Conversely, when the light sensor 220 detects that the ambient light is lower than the predetermined value, the microcontroller 240 activates the PC mode, i.e., outputting a high voltage from pin PC and a low voltage from pin PS, to activate the transistor Q1 while cut-off the transistor Q2, thereby forming the current path 352, to turn on the three LEDs L1~L3 in the light-emitting unit 350 so as to generate the high level illumination for a predetermined duration. After the predetermined duration, the microcontroller 240 may switch to the PS mode by having the pin PC continue outputting a high voltage and the pin PS outputting a high voltage, to have the transistor Q2 conducts, thereby forming the current path 351. Consequently, only the LED L1 is turned on and the low level illumination is generated.

Figure 3B:
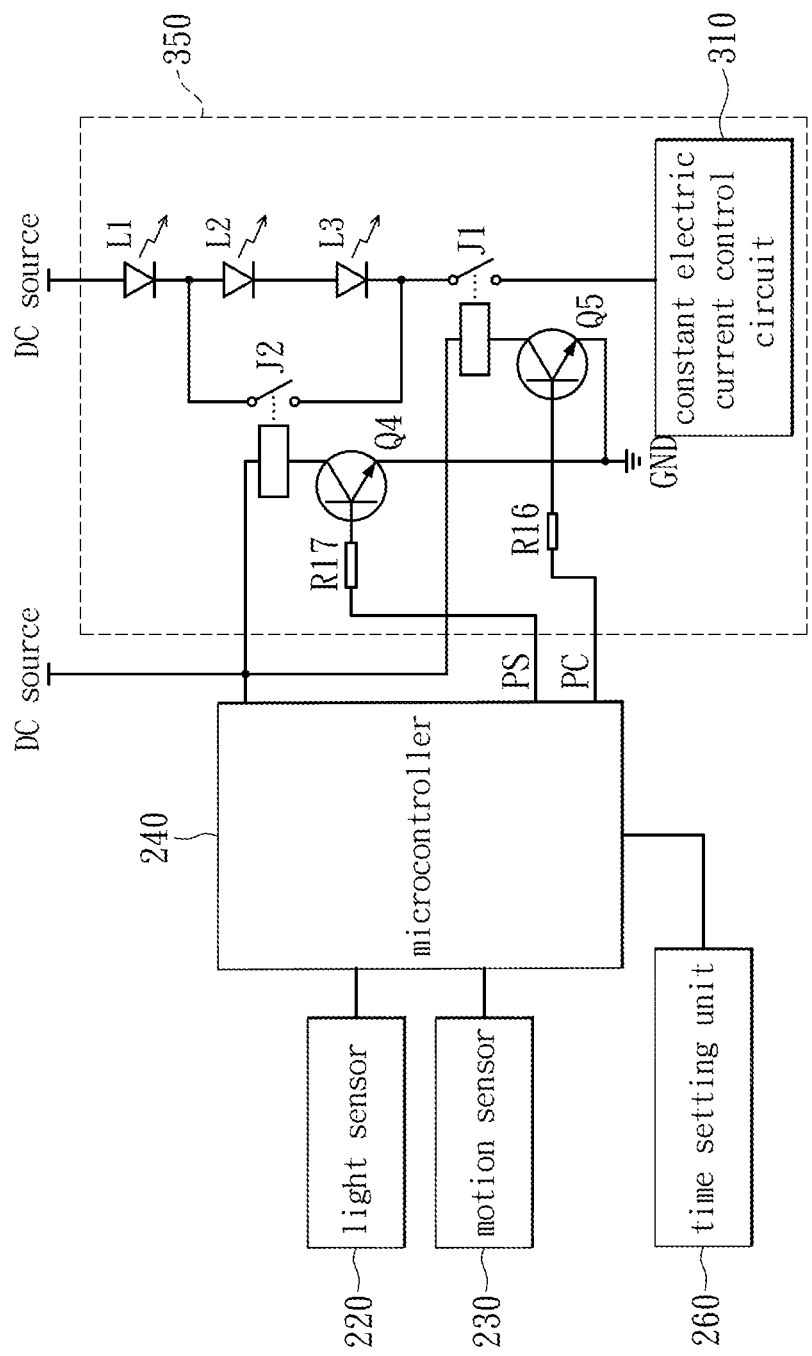
FIG. 3B illustrates a schematic diagram of a two-level LED security light in accordance to the second exemplary embodiment of the present disclosure.

When the motion sensor detects a human motion in the PS mode, the pin PS of the microcontroller 240 temporarily switches from the high voltage to a low voltage, to have the transistor Q2 temporarily cuts-off thus forming the current path 352 to activate all the LEDs in the light-emitting unit 350, thereby temporarily generates the high level illumination. The light-emitting unit 350 is driven by a constant electric current, therefore the illumination level generated thereof is directly proportional to the number of LEDs activated. FIG. 3B illustrates another implementation for FIG. 3A, wherein the relays J1 and J2 are used in place of NMOS transistors to serve as switches. The microcontroller 240 may control the relays J2 and J1 through regulating the switching operations of the NPN bipolar junction transistors Q4 and Q5. Moreover, resistors R16 and R17 are current-limiting resistors.

In the PC mode, the relay J1 being pull-in while the relay J2 bounce off to have constant electric current driving all the LEDs L1~L3 to generate the high level illumination; in PS mode, the relays J1 and J2 both pull-in to have constant electric current only driving the LED L1 thus the low level illumination may be thereby generated. Furthermore, when the motion sensor 230 detects a human motion, the pin PS of the microcontroller 240 may temporarily switch from high voltage to low voltage, forcing the relay J2 to temporarily bounce off and the relay J1 pull-in so as to temporarily generate the high level illumination.

The LED L1 may adopt a LED having color temperature of 2700K while the LEDs L2 and L3 may adopt LEDs having color temperature of 5000K in order to increase the contrast between the high level and the low level illuminations. The number of LEDs included in the light-emitting unit 350 may be more than three, for example five or six LEDs. The transistor Q2 may be relatively parallel to the two ends associated with a plurality of LEDs to adjust the illumination difference between the high and the low illumination levels. Additionally, the light-emitting unit 350 may include a plurality of transistors Q2, which are respectively coupled to the two ends associated with each LED to provide more lighting variation selections. The microcontroller 240 may decide the number of LEDs to turn on in accordance to design needs at different conditions. Based on the explanation of the aforementioned exemplary embodiment, those skills in the art should be able to deduce other implementation and further descriptions are therefore omitted.

Third Exemplary Embodiment

Refer back to FIG. 1, wherein the light-emitting unit 150 may include a phase controller and one or more parallel-connected alternating current (AC) LEDs. The phase controller is coupled between the described one or more parallel-connected ACLEDs and AC power source. The loading and power controller 140 in the instant exemplary embodiment may through the phase controller adjust the average power of the light-emitting unit 150 so as to generate variations in the low level and the high level illuminations.

Figure 4A:
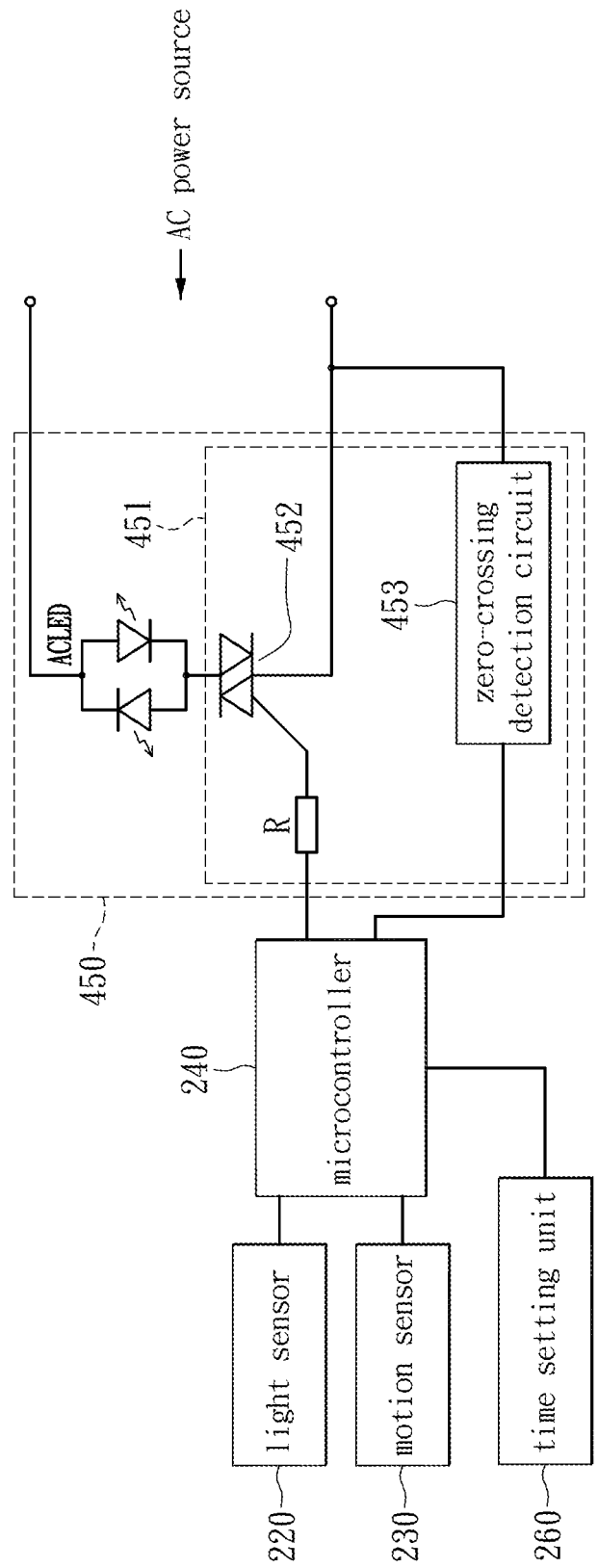
FIG. 4A illustrates a schematic diagram of a two-level LED security light in accordance to the third exemplary embodiment of the present disclosure.

Refer to FIG. 4A, which illustrates a schematic diagram of a two-level LED security light 100 in accordance to the third exemplary embodiment of the present disclosure. The main difference between FIG. 4A and FIG. 3 is in that the light-source load is an ACLED, which is coupled to the AC power source, and further the light-emitting unit 450 includes a phase controller 451. The phase controller 451 includes a bi-directional switching device 452, here, a triac, a zero-crossing detection circuit 453, and a resistor R. The microcontroller 240 turns off the light-emitting unit 450 when the light sensor 220 detects that the ambient light is higher than a predetermined value. Conversely, when the light sensor 220 detects that the ambient light is lower than the predetermined value, the microcontroller 240 activates the PC mode by turning on the light-emitting unit 450. In the PC mode, the microcontroller 240 may select a control pin for outputting a pulse signal which through a resistor R triggers the triac 452 to have a large conduction angle. The large conduction angle configures the light-emitting unit 450 to generate a high level illumination for a predetermined duration. Then the microcontroller 240 outputs the pulse signal for PS mode through the same control pin to trigger the triac 452 to have a small conduction angle for switching the light-emitting unit 450 from the high level illumination to the low level illumination of the PS mode. Moreover, when the motion sensor 230 (also called motion sensing unit) detects a human motion in the PS mode, the microcontroller 240 temporarily outputs the PC-mode pulse signal through the same control pin to have the light-emitting unit 450 generated the high level illumination for a short predetermined duration. After the short predetermined duration, the light-emitting unit 450 returns to the low level illumination.

In the illumination control of the ACLED, the microcontroller 240 may utilize the detected zero-crossing time (e.g., the zero-crossing time of an AC voltage waveform) outputted from the zero-crossing detection circuit 453 to send an AC synchronized pulse signal thereof which may trigger the triac 452 of the phase controller 451 thereby to change the average power input to the light-emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform.

Supposing an AC power source having a voltage amplitude $V_m$ and frequency f, then the zero-crossing time gap $t_D$ of the trigger pulse outputted by the microcontroller 240 should be limited according to $t_o < t_D < \frac{1}{2}f^{-t}_o$ for a light-source load with a cut-in voltage $V_t$, wherein $t_o = (\frac{1}{2}\pi f) \sin^{-1}(V_t/V_m)$. The described criterion is applicable to all types of ACLEDs to assure that the triac 452 can be stably triggered in both positive and negative half cycle of the AC power source. Take ACLED with $V_t$ (rms)=80V as an example, and supposing the $V_m$(rms)=110V and f=60 Hz, then $t_o$=2.2 ms and ($\frac{1}{2}$f)=8.3 ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms$<t_D<$6.1 ms.

Figure 4B:
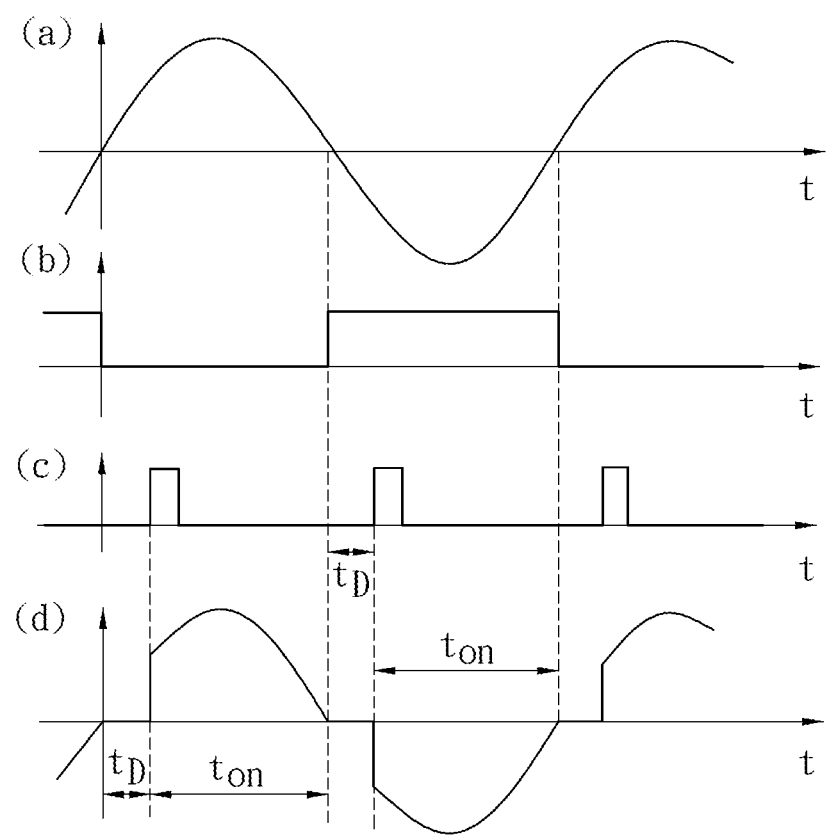
FIG. 4B illustrates a timing waveform of two-level LED security light in accordance to the third exemplary embodiment of the present disclosure.

Refer to FIG. 4B, which illustrates a timing waveform of the two-level LED security light in accordance to the third exemplary embodiment of the present disclosure. Waveforms (a)~(d) of FIG. 4B respectively represent the AC power source, the output of the zero-crossing detection circuit 453, the zero-crossing delay pulse at the control pin of the microcontroller 240, and the voltage waveform across the two ends of the ACLED in the light-emitting unit 450. The zero-crossing detection circuit 453 converts the AC voltage sinusoidal waveform associated with the AC power source to a symmetric square waveform having a low and a high voltage levels as shown in FIG. 4B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 4B(c), the microcontroller 240 outputs a zero-crossing delay pulse in correspondence to the zero-crossing point of the AC sinusoidal waveform in accordance to the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 4B(d) illustrates a voltage waveform applied across the two ends associated with the ACLED. The illumination level of the light-emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Figure 5:
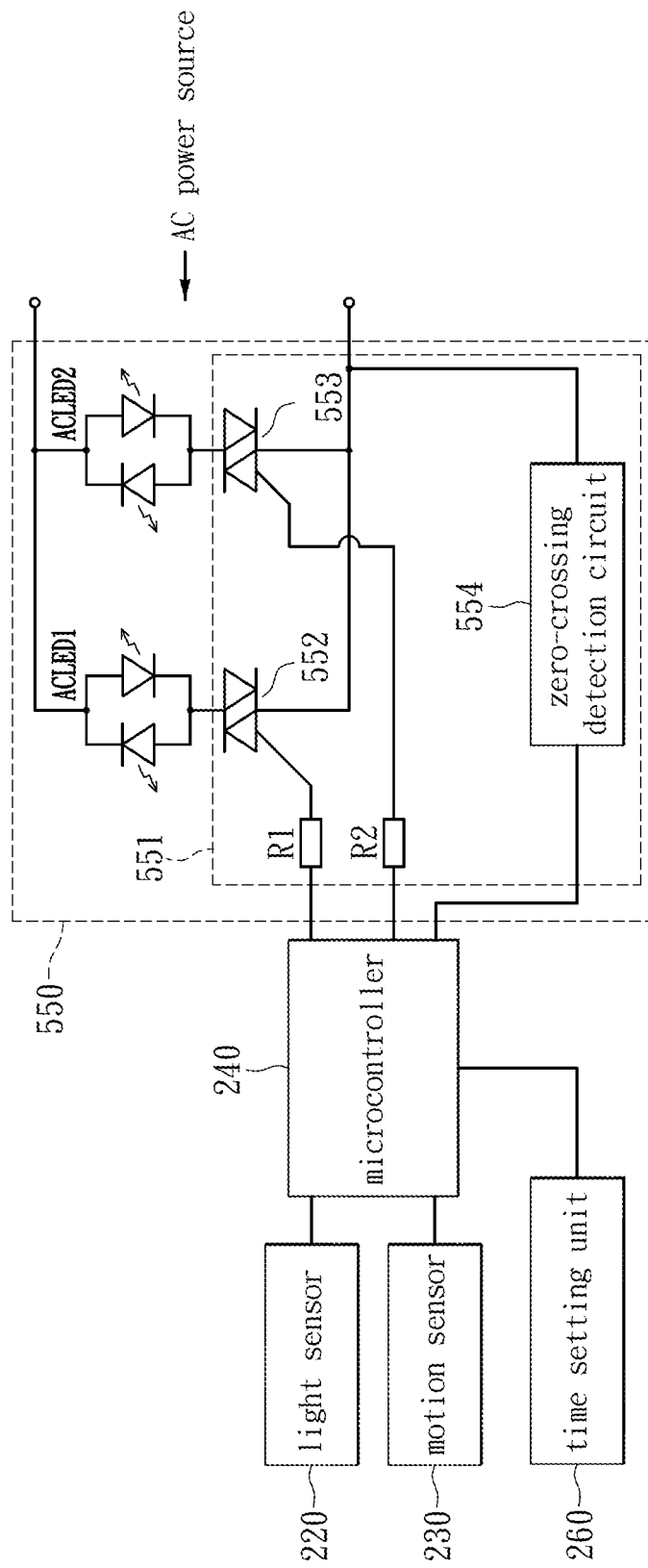
FIG. 5 illustrates a schematic diagram of a two-level LED security light in accordance to the third exemplary embodiment of the present disclosure.

Refer to FIG. 5, which illustrates a schematic diagram of a two-level LED security light 100 in accordance to the third exemplary embodiment of the present disclosure. The light-emitting unit 550 of the lighting apparatus 100 includes an ACLED1, an ACLED2, and a phase controller 551. The phase controller 551 includes triacs 552 and 553, the zero-crossing detection circuit 554 as well as resistors R1 and R2. The light-emitting unit 550 of FIG. 5 is different from the light-emitting unit 450 of FIG. 4 in that the light-emitting unit 550 has more than one ACLEDs and more than one bi-directional switching devices. Furthermore, the color temperatures of the ACLED1 and the ACLED2 may be selected to be different.

In the exemplary embodiment of FIG. 5, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the high level illumination as well as illumination of mix color temperature. In the PS mode, the microcontroller 240 uses the phase controller 551 to trigger only the ACLED2 to conduct for a short period, thereby generates the low level illumination as well as illumination of low color temperature. Moreover, in the PS mode, when the motion sensor 230 detects a human motion, the microcontroller 240 may through the phase controller 551 trigger the ACLED1 and ACLED2 to conduct for a long period. Thereby, it may render the light-emitting unit 450 to generate the high level illumination of high color temperature and to produce high contrast in illumination and hue, for a short predetermined duration to warn the intruder. Consequently, the lighting apparatus may generate the high level or the low level illumination of different hue. The rest of operation theories associated with the light-emitting unit 550 are essentially the same as the light-emitting unit 450 and further descriptions are therefore omitted.

Fourth Exemplary Embodiment

Figure 6:
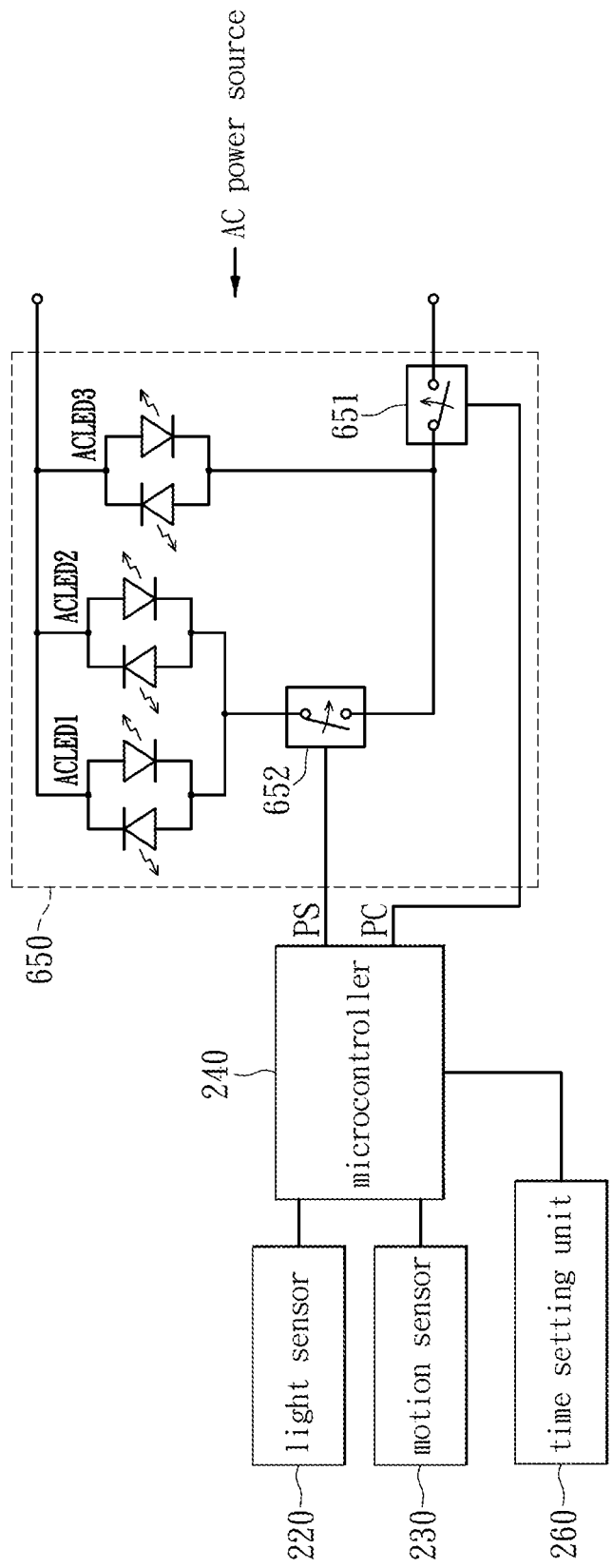
FIG. 6 illustrates a schematic diagram of a two-level LED security light in accordance to the fourth exemplary embodiment of the present disclosure.

Refer to FIG. 6, which illustrates a schematic diagram of a two-level LED security light 100 in accordance to the fourth exemplary embodiment of the present disclosure. The light-emitting unit 150 of FIG. 1 may be implemented by the light-emitting unit 650, wherein the light-emitting unit 650 includes three ACLED1~3 having identical luminous power as well as switches 651 and 652. In which, switches 651 and 652 may be relays. The parallel-connected ACLED1 and ACLED2 are series-connected to the switch 652 to produce double luminous power, and of which the ACLED3 is parallel connected to, to generate triple luminous power, and of which an AC power source is further coupled to through the switch 651. Moreover, the microcontroller 240 implements the loading and power control unit 140 of FIG. 1. The pin PC and pin PS are respectively connected to switches 651 and 652 for outputting voltage signals to control the operations of switches 651 and 652 (i.e., open or close).

In the PC mode, the pin PC and pin PS of the microcontroller 240 control the switches 651 and 652 to be closed at same time. Consequently, the ACLED1~3 are coupled to the AC power source and the light-emitting unit 650 may generate a high level illumination of triple luminous power. After a short predetermined duration, the microcontroller 240 returns to PS mode. In which the switch 651 is closed while the pin PS controls the switch 652 to be opened, consequently, only the ACLED3 is connected to AC power source, and the light-emitting unit 650 may thus generate the low level illumination of one luminous power. In the PS mode, when the motion sensor 230 detects a human motion, the microcontroller 240 temporarily closes the switch 652 to generate high level illumination with triple luminous power for a predetermined duration. After the predetermined duration, the switch 652 returns to open status thereby to generate the low level illumination of one luminous power. The lighting apparatus of FIG. 6 may therefore through controlling switches 651 and 652 generate two level illuminations with illumination contrast of at least 3 to 1.

The ACLED1 and ACLED2 of FIG. 6 may be high power lighting sources having color temperature of 5000K. The ACLED3 may be a low power lighting source having color temperature of 2700K. Consequently, the ACLED may generate two levels of illuminations with high illumination and hue contrast without using a zero-crossing detection circuit.

Fifth Exemplary Embodiment

Figure 7:
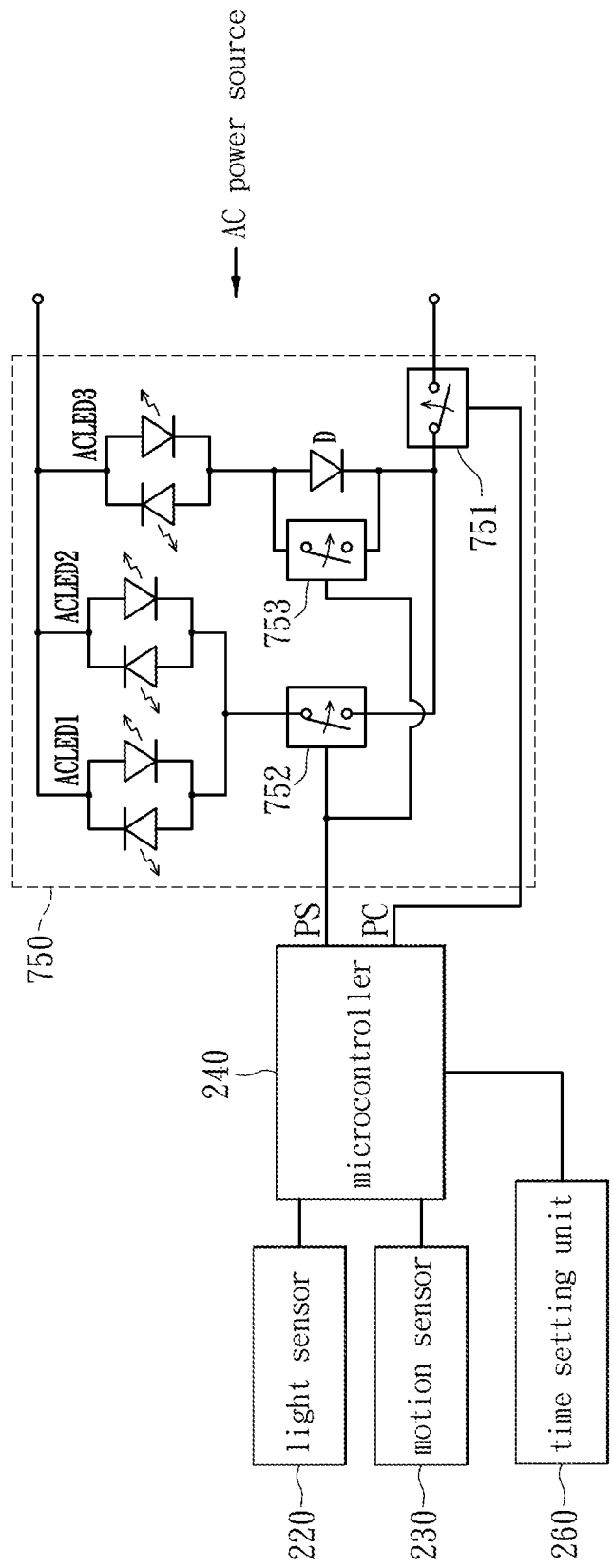
FIG. 7 illustrates a schematic diagram of a two-level LED security light in accordance to the fifth exemplary embodiment of the present disclosure.
Figure 8A:
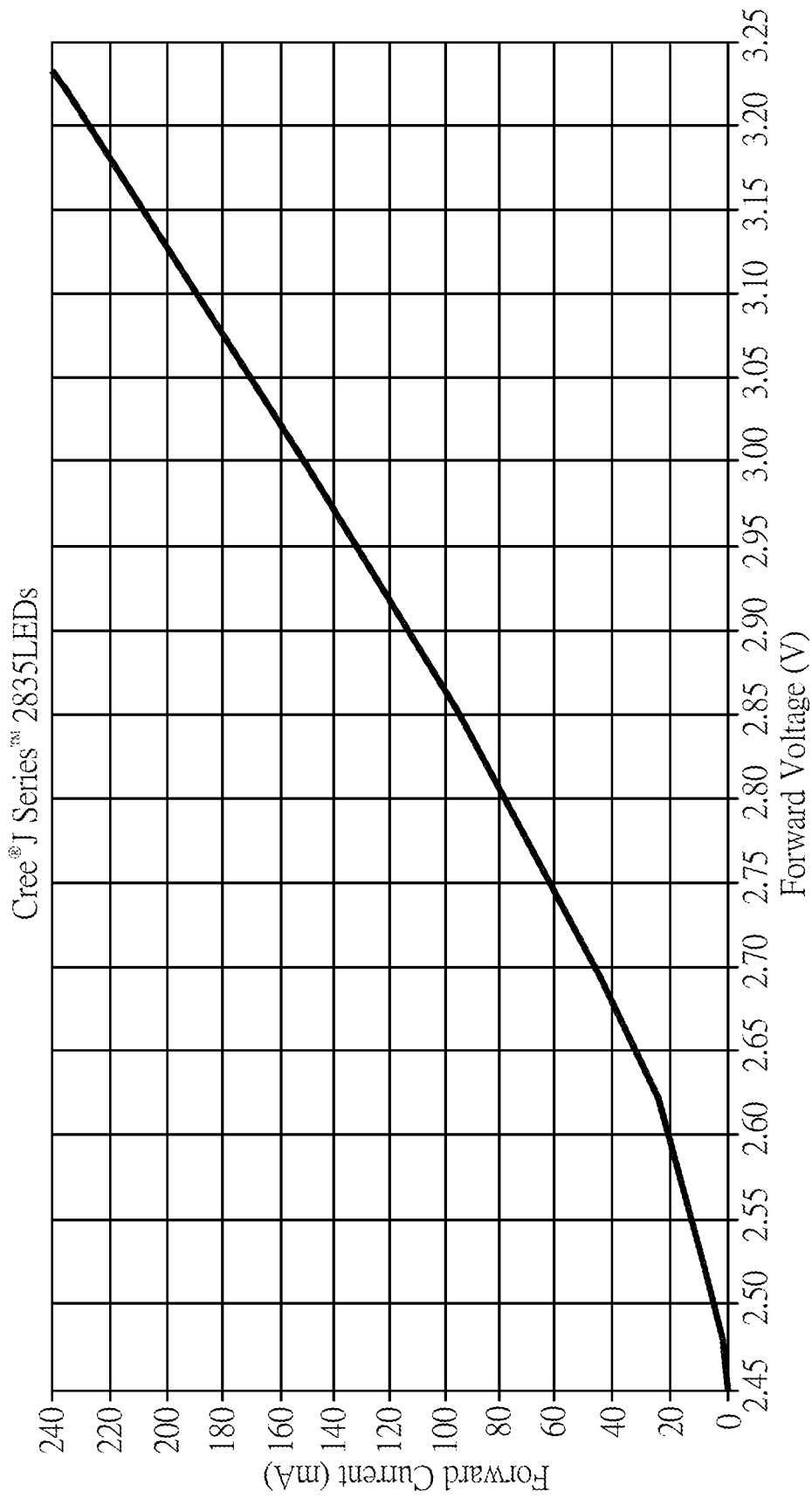
Figure 8B:
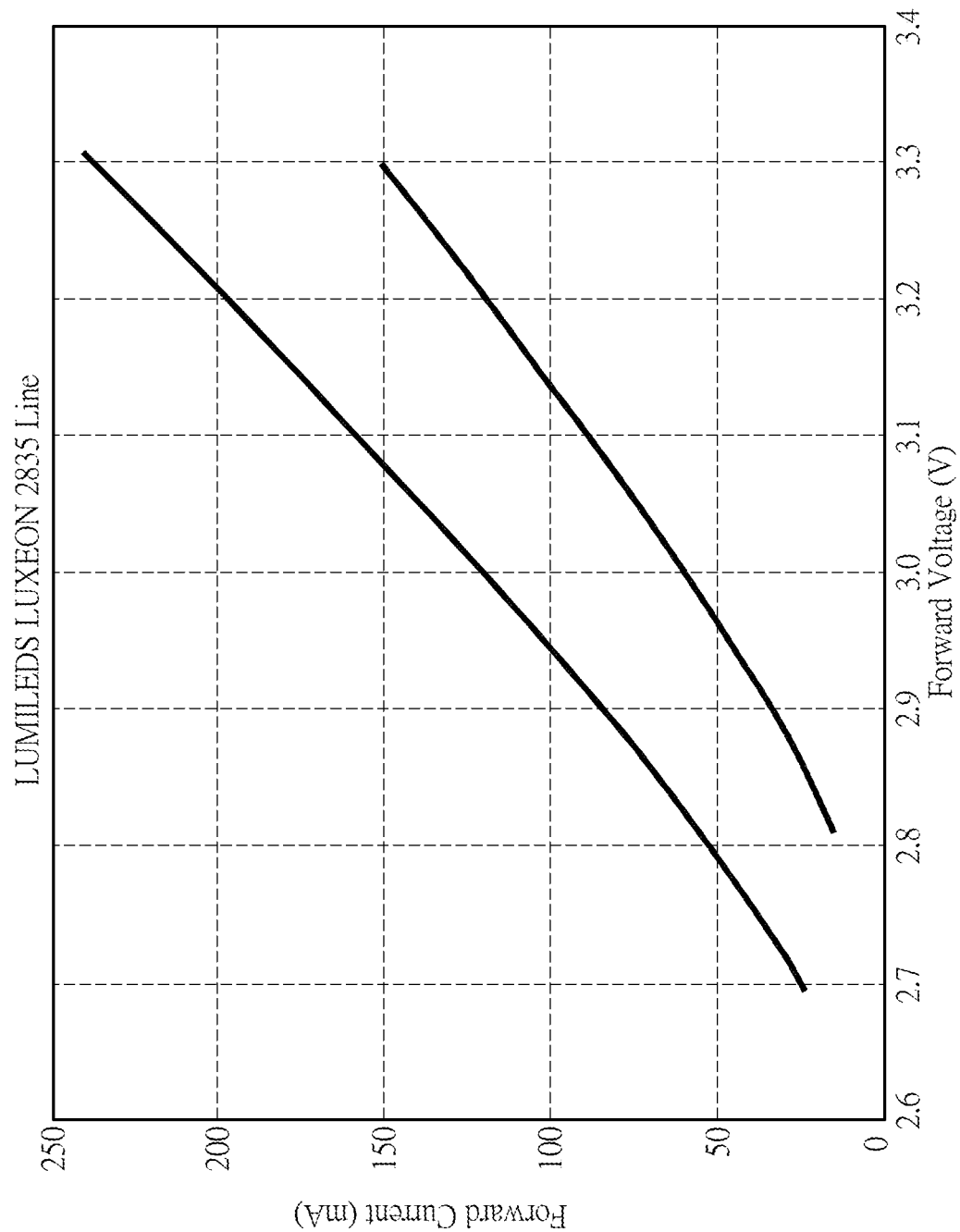
Figure 8C:
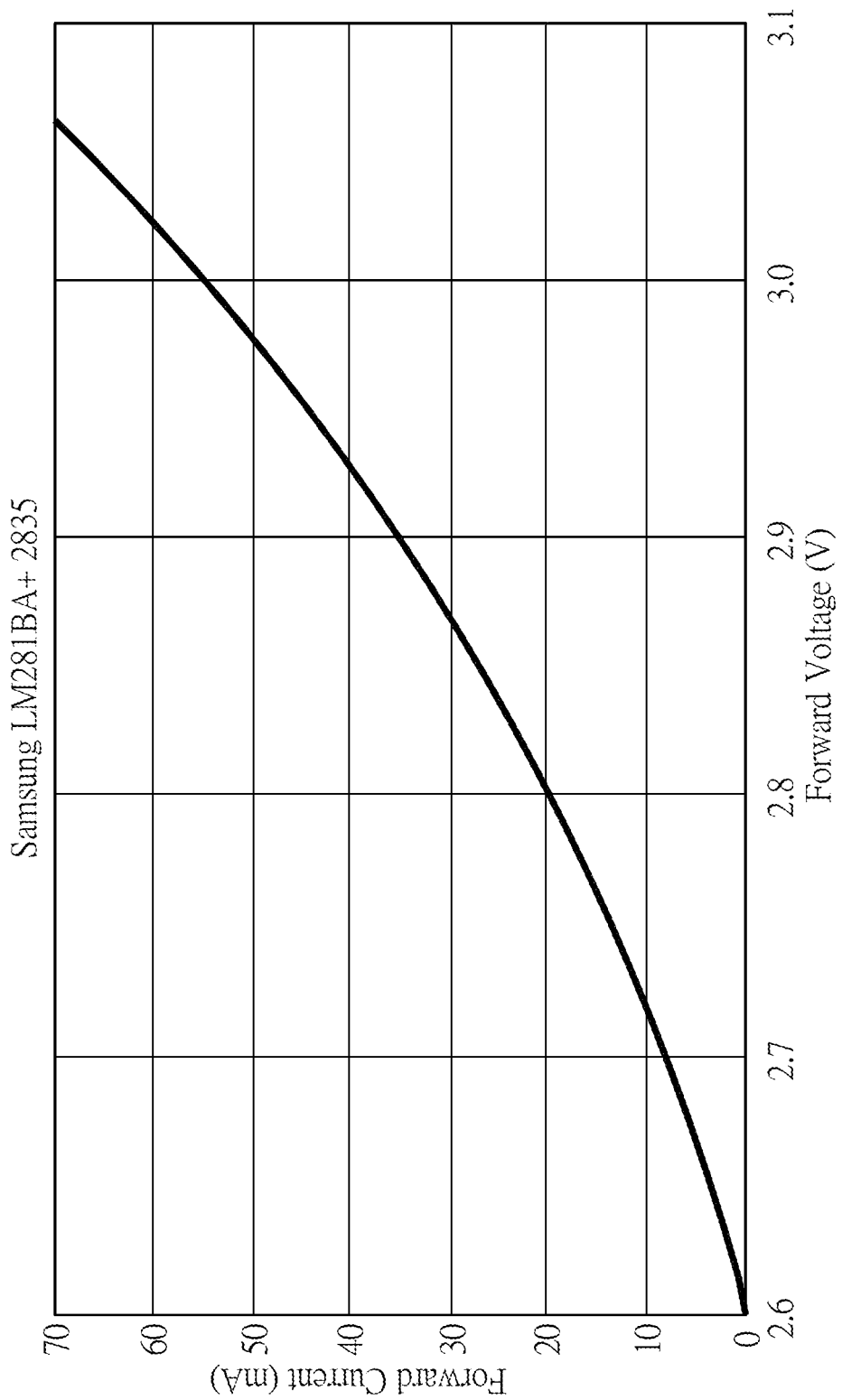

Refer to FIG. 7, which illustrates a schematic diagram of a two-level LED security light in accordance to the fifth exemplary embodiment of the present disclosure. The light-emitting unit 750 of FIG. 7 is different from the light-emitting unit 640 of FIG. 6 in that the ACLED3 is series-connected to a circuit with a rectified diode D and a switch 753 parallel-connected together, and of which is further coupled through a switch 751 to AC power source. When the switch 753 closes, the AC electric current that passes through the ACLED3 may be a full sinusoidal waveform. When the switch 753 opens, the rectified diode rectifies the AC power, thus only one half cycle of the AC electric current may pass through the ACLED, consequently the luminous power of ALCED3 is cut to be half.

The pin PS of the microcontroller 240 synchronously controls the operations of switches 752 and 753. If the three ACLED1~3 have identical luminous power, then in the PC mode, the pin PC and pin PS of the microcontroller 240 synchronously close the switches 751~753 to render ACLED1~3 illuminating, thus the light-emitting unit 750 generates a high level illumination which is three-times higher than the luminous power of a single ACLED. When in the PS mode, the microcontroller 240 closes the switch 751 while opens switches 752 and 753. At this moment, only the ACLED3 illuminates and as the AC power source is rectified by the rectified diode D, thus the luminous power of ACLED3 is half of the AC power source prior to the rectification. The luminous power ratio between the high level and the low level illuminations is therefore 6 to 1. Consequently, strong illumination contrast may be generated to effectively warn the intruder.

It should be noted that the light-emitting unit in the fifth exemplary embodiment is not limited to utilizing ACLEDs. In other words, the light-emitting unit may include any AC lighting sources such as ACLEDs, incandescent lamps, or fluorescent lamps.

A lighting apparatus may be implemented by integrating a plurality of LEDs with a microcontroller and various types of sensor components in the controlling circuit in accordance to the above described five exemplary embodiments. This lighting apparatus may automatically generate high level illumination when the ambient light detected is insufficient and time-switch to the low level illumination. In addition, when a person is entering the predetermined detection zone, the lighting apparatus may switch from the low level illumination to the high level illumination, to provide the person with sufficient illumination or to generate strong illumination and hue contrast for monitoring the intruder.

When the light source of the light emitting unit 150 is confined to the use of an LED load, the compliance and satisfaction of a voltage operating constraint attributable to the unique electrical characteristics of the LED load is vital to a successful performance of an LED lighting device. Any LED lighting device failing to comply with the voltage operating constraint of the unique electrical characteristics is bound to become a trouble art. This is because the LED as a kind of solid state light source has completely different electrical characteristics for performing light emission compared with conventional light source such as incandescent bulbs or fluorescent bulbs. For instance, for a white light or blue light LED there exists a very narrow voltage domain ranging from a threshold voltage at 2.5 volts to a maximum working voltage at 3.3 volts, which allows to operate adequately and safely the LED; in other words, when a forward voltage imposed on the LED is lower than the threshold voltage, the LED is not conducted and therefore no light is emitted, when the forward voltage exceeds the maximum working voltage, the heat generated by a forward current could start damaging the construction of the LED. Therefore, the forward voltage imposed on the LED is required to operate between the threshold voltage and the maximum working voltage.

In respect to the LED load of the light-emitting unit 150, the cut-in voltage $V_t$ of ACLEDs is technically also referred to as the threshold voltage attributable to PN junctions manufactured in LEDs. More specifically, the LED is made with a PN junction semiconductor structure inherently featured with three unique electrical characteristics, the first characteristic is one-way electric conduction through the PN junction fabricated in the LED, the second electrical characteristic is the threshold voltage $V_{th}$ required to trigger the LED to start emitting light and the third electrical characteristic is a maximum working voltage $V_{max}$ allowed to impose on the LED to avoid a thermal runaway to damage or burn out the semiconductor construction of the LED. The described cut-in voltage $V_t$ has the same meaning as the above mentioned threshold voltage $V_{th}$ which is a more general term to be used for describing the second electrical characteristic of a PN junction semiconductor structure. Also because the cut-in voltage $V_t$ is specifically tied to forming a formula to transform the threshold voltage into a corresponding time phase of AC power for lighting control, it is necessary to use the term $V_{th}$ as a neutral word for describing the LED electrical characteristics to avoid being confused with the specific application for ACLED alone. Additionally, it is to be clarified that the term $V_m$ is related to the amplitude of the instant maximum voltage of an AC power source which has nothing to do with the third electrical characteristic $V_{max}$ of an LED load.

An LED chip is a small piece of semiconductor material with at least one LED manufactured inside the semiconductor material. A plurality of LEDs may be manufactured and packaged inside an LED chip for different levels of wattage specification to meet different illumination need. For each LED chip designed with a different level of wattage specification there always exists a narrow voltage domain $V_{th}<V<V_{max}$, wherein V is a voltage across the LED chip, $V_{th}$ is the threshold voltage to enable the LED chip to start emitting light and $V_{max}$ is the maximum working voltage allowed to impose on the LED chip to protect the LED chip from being damaged or burned out by the heat generated by a higher working voltage exceeding $V_{max}$.

For an LED load configured with a plurality of the LED chips in any LED lighting device, regardless such LED load being configured with ACLED chips or DC LED chips, the working voltage V of each single LED chip is required to operate in a domain between a threshold voltage $V_{th}$ and a maximum working voltage $V_{max}$ or $V_{th}<V<V_{max}$ and the working voltage $V_N$ of the LED load comprising N pieces of LED chips connected in series is therefore required to operate in a domain established by a threshold voltage of N times $V_{th}$ ($N \times V_{th}$) and a maximum working voltage of N times $V_{max}$ ($N \times V_{max}$) or $N \times V_{th}<V_N<N \times V_{max}$, wherein N is the number of the LED chips electrically connected in series. For any LED lighting device comprising an LED load it is required that the LED load in conjunction with an adequate level of power source is configured with a combination of in series and in parallel connections of LED chips such that the electric current passing through each LED chip of the LED load remains at an adequate level such that a voltage V across each LED chip complies with an operating constraint of $V_{th}<V<V_{max}$ featuring electrical characteristics of the LED chip or a voltage $V_N$ across the LED load configured with N number of LED chips connected in series complies with an operating constraint of $N \times V_{th}<V_N<N \times V_{max}$. Such narrow operating range therefore posts an engineering challenge for a circuit designer to successfully design an adequate level of power source and a reliable circuitry configured with an adequate combination of in series connection and in parallel connection of LED chips for operating a higher power LED security light.

FIGS. 8A, 8B, 8C and 8D comprises 4 drawings schematically and respectively showing a I-V relationship chart (Forward Current vs. Forward Voltage) for a white light LED chip from each of 4 different LED manufacturers; as can be seen from the chart when a forward voltage V is below a minimum forward voltage at around 2.5 volts, the LED chip is not conducted so the current I is zero, as the forward voltage exceeds 2.5 volts the LED chip is activated to generate a current flow to emit light, as the forward voltage continues to increase, the current I increases exponentially at a much faster pace, at a maximum forward voltage around 3.3 volts the current I becomes 250 mA which generates a heat that could start damaging the PN junction of the LED chip. The minimum forward voltage, i.e., the threshold voltage or the cut-in voltage, and the maximum forward voltage are readily available in the specification sheets at each of LED manufacturers, such as Cree, Lumileds, Samsung, Osram, and etc. Different LED manufacturers may have slightly different figures due to manufacturing process but the deviations of differences are negligible. The constraints of minimum forward voltage and maximum forward voltage represent physical properties inherent in any solid state light source. They are necessary matter for configuring any LED lighting products to ensure a normal performance of an LED load.

FIG. 9 is a data sheet showing data of the minimum forward voltages and maximum forward voltages collected from various LED manufacturers. They are fundamental requirements for configuring any LED lighting control devices to ensure a successful performance of any LED lighting device.

In summary, the compliance of voltage operating constraint $V_{th}<V<V_{max}$ featuring electrical characteristics of an LED chip is a critical technology for ensuring a normal performance of the LED load. Failing to comply with such voltage operating constraint can quickly age or seriously damage the semiconductor structure of the LED chip with a consequence of quick lumens depreciation of the LED bulbs and the product lifetime being substantially shortened, which will be unacceptable to the consumers. The compliance of the operating constraint $V_{th}<V<V_{max}$ is a necessary matter for any LED lighting device though it is not an obvious matter as it requires complicated technologies to calculate and coordinate among an adequate level of power source, a control circuitry and a non-linear light emitting load. For conventional lighting load such as incandescent bulb there exists no such operating constraint. This is why in the past years there had been many consumers complaining about malfunction of LED bulbs that the consumers were frustrated with the fast depreciation of lumens output and substantially shortened product lifetime of the LED bulbs purchased and used. A good example was a law suit case filed by the Federal Trade Commission on Sep. 7, 2010 (Case No. SACV10-01333 JVS) for a complaint against a leading lighting manufacturer for marketing deceptive LED lamps and making false claims with respect to the life time of their LED lamps and a huge amount of monetary relief was claimed with the Court in the complaint.

The present disclosure of a two-level LED security light provides a unique life-style lighting solution. The motivation of creating such life-style lighting solution has less to do with the energy saving aspect of the low level illumination mode because an LED is already a very energy saving light source compared with the conventional incandescent light source. For instance, a 10-watt LED security light when operated at a low level at 30% illumination it only saves 7 watts, which is not as significant as a 100-watt incandescent bulb which can save as much as 70 watts when operated at 30% illumination for a low level mode. While it is always good to save some extra energy, it is however not the main incentives for developing the present invention; the life-style lighting solution of the present disclosure is featured with two innovations which meaningfully improve the exquisite tastes of living in the evening, the first innovation is the creation of an aesthetic scene for the outdoor living environment, wherein at dusk the LED security light is automatically turned on by the photo sensor to perform the low level illumination with a low color temperature which is necessary for creating a soft and aesthetic night scene for the outdoor living area (such soft and aesthetic night view is not achievable by the high level illumination however), the second innovation is the creation of a navigation capacity similar to a light house effect for guiding people to safely move toward a destination in the outdoor living area without getting lost or encountering an accident, wherein when a motion intrusion is detected by the motion sensor the security light is instantly changed to perform a high level illumination mode with a high color temperature light which offers people a high visibility of the surrounding environment when needed. For the visibility of a surrounding environment the high color temperature light is the winner while for the creation of a soft and aesthetic night view there is no substitute for the low color temperature light. It is the innovation of the present invention to configure a life-style security light with a low color temperature LED load and a high color temperature LED load respectively activated by a photo sensor and a motion sensor to resemble the natural phenomenon of a sun light. These two innovative functions ideally implemented by the LED loads coupled with the motion sensor to increase illumination with a high visibility when people enters into the short detection area make the present invention a perfect life-style lighting solution for enjoying an exquisite taste of evening life.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A lifestyle two-level LED security light comprising:
a light-emitting unit configured with an LED load;
a loading and power control unit;
a light sensing control unit;
a motion sensing unit; and
a power supply unit;
wherein the LED load of the light-emitting unit includes a plurality of LEDs divided into two sets with a first set of N number LEDs and a second set of M number LEDs, wherein N and M are positive integers;
wherein the loading and power control unit includes a controller electrically coupled to the light sensing control unit, the motion sensing unit and at least two switching devices including at least a first switching device and a second switching device;
wherein the first switching device and the second switching device are electrically connected with the first set of N number LEDs and the second set of M number LEDs, wherein the first switching device and the second switching device are controlled by the controller to be conducting or cut-off to perform at least a first switching mode and a second switching mode;
wherein in the first switching mode the power supply unit drives at least the first set of N number LEDs to perform a low level illumination with a low light intensity and in the second switching mode the power supply unit drives at least the second set of M number LEDs to perform a high level illumination with a high light intensity;
wherein when an ambient light detected by the light sensing control unit is lower than a predetermined value, the loading and power control unit manages to turn on the first set of N number LEDs in the light-emitting unit to generate the low level illumination;
wherein when the ambient light detected by the light sensing control unit is higher than the predetermined value, the light-emitting unit is switched off;
wherein when a motion intrusion is detected by the motion sensing unit, the loading and power control unit manages to turn on at least the second set of M number LEDs to generate the high level illumination for a predetermined duration before resuming to the low level illumination; wherein the controller comprises at least a programmable integrated circuit device or an application specific integrated circuit, and wherein the plurality of LEDs of the first set of N number LEDs and the second set of M number LEDs in conjunction with a power level setting of the power supply unit are respectively designed with a configuration of in series and/or in parallel connections of LEDs such that an electric current passing through each LED of the light-emitting unit remains at an adequate level, and a voltage V across each LED complies with an operating constraint of $V_{th}<V<V_{max}$ featuring electrical characteristics of an LED; wherein $V_{th}$ is a threshold voltage required to trigger each LED to start emitting light and $V_{max}$ is a maximum operating voltage across each LED to avoid a thermal damage to LED construction.

2. The lifestyle two-level LED security light according to claim 1, wherein when the second set of M number LEDs is turned on upon detecting the motion intrusion, the loading and power control unit continues to turn on the first set of N number LEDs.

3. The lifestyle two-level LED security light according to claim 1, wherein when the second set of M number LEDs is turned on upon detecting the motion intrusion, the loading and power control unit manages to turn off the first set of N number LEDs.

4. The lifestyle two-level LED security light according to claim 1, wherein a total wattage of the M number LEDs is greater than a total wattage of the N number LEDs.

5. The lifestyle two-level LED security light according to claim 1, wherein a total wattage of the M number LEDs is equal to a total wattage of the N number LEDs.

6. The lifestyle two-level LED security light according to claim 1, wherein the power supply unit outputs a DC power for operating the two-level LED security light, wherein the first set of N number LEDs and the second set of M number LEDs are connected in series, wherein a constant current control circuit is connected in series with the light-emitting unit such that an electric current level remains stable in light of a drastic change of lighting load between driving the N number LEDs for generating the low level illumination and driving at least the M number LEDs for generating the high level illumination.

7. The lifestyle two-level LED security light according to claim 6, wherein when the two-level LED security is operated to generate the low level illumination, the low light intensity is further adjustable by the controller; wherein the first set of N number LEDs is configured to include a plurality of switching devices electrically coupled to the first set of N number LEDs and to the controller, wherein the controller is configured to control the number of LEDs to be turned on in the N number LEDs through bypassing unwanted LEDs in the N number LEDs respectively with the associated switching device(s) according to an external control signal played by a user or according to a value of a voltage divider set by the user.

8. The lifestyle two-level LED security light according to claim 6, wherein when the two-level LED security is operated to generate the high level illumination, the high light intensity is further adjustable by the controller; wherein the second set of M number LEDs is configured to include a plurality of switching devices electrically coupled to the second set of M number LEDs and to the controller, wherein the controller is configured to control the number of LEDs to be turned on in the M number LEDs through bypassing unwanted LEDs in the M number LEDs with the associated switching device(s) according to an external control signal played by a user or according to a value of a voltage divider set by the user.

9. The lifestyle two-level LED security light according to claim 1, wherein the power supply unit outputs at least one DC power for operating the two-level LED security light; wherein the first set of N number LEDs and the second set of M number LEDs are connected in parallel, wherein the first switching device is electrically connected in series between the first set of N number LEDs and the power supply unit, wherein the second switching device is electrically connected in series between the second set of M number LEDs and the power supply unit.

10. The lifestyle two-level LED security light according to claim 9, wherein when the two-level LED security light is operated to generate the low level illumination, the low light intensity of the low level illumination is further adjustable by the controller; wherein the controller in response to an external control signal played by a user outputs a PWM signal to control a time length of conduction period of the first switching device in each duty cycle such that an average electric current proportional to the time length of the conduction period is delivered to the light-emitting unit for performing a dimming work of the low level illumination mode.

11. The lifestyle two-level LED security light according to claim 9, wherein when the two-level LED security light is operated to generate the high level illumination, the high light intensity of the high level illumination is further adjustable by the controller; wherein the controller in response to an external control signal played by a user outputs at least a PWM signal to control a time length of conduction period of at least the second switching device in each duty cycle such that an average electric current proportional to the time length of the conduction period is delivered to the light-emitting unit for performing a dimming work of the high level illumination mode.

12. The lifestyle two-level LED security light according to claim 9, wherein when the two-level LED security light is operated to generate the high level illumination, the high light intensity of the high level illumination is further adjustable by the controller; wherein the controller in response to an external control signal played by a user outputs PWM signals to control time lengths of conduction periods of both the first switching device and the second switching device in each duty cycle such that average electric currents proportional to the time lengths of the conduction periods are delivered to the light-emitting unit for performing a dimming work of the high level illumination mode.

13. The lifestyle two-level LED security light according to claim 1, wherein when each of the first set of N number LEDs and the second set of M number LEDs is configured with a plurality of LEDs electrically connected in series or sets of in parallel connected LEDs electrically connected in series, a working voltage across each of the first set of N number LEDs and the second set of M number LEDs is confined in a domain between a minimum voltage equal to the sum of the threshold voltages of all LEDs electrically connected in series or sets of in parallel connected LEDs electrically connected in series and a maximum voltage equal to the sum of the maximum voltages of all LEDs electrically connected in series or sets of in parallel connected LEDs electrically connected in series.

14. The lifestyle two-level LED security light according to claim 13, wherein the LED has the voltage V across each LED complying with an operating constraint of 2.5 volts $<V_{th}<V<V_{max}<3.5$ volts and the first set of N number LEDs and the second set of M number LEDs are required to operate with respective operating voltages $V_N$ and $V_M$ confined in domains expressed by $N_S \times 2.5$ volts $<V_N<N_S \times 3.5$ volts and $M_S \times 2.5$ volts $<V_M<M_S \times 3.5$ volts, with $N_S$ and $M_S$ respectively denoting the numbers of series connected LEDs in the first set of N number LEDs and the second set of M number LEDs, wherein $N_S \leq N$ and $M_S \leq M$.

15. A lifestyle two-level LED security light comprising:
a light-emitting unit configured with an LED load;
a loading and power control unit;
a light sensing control unit;
a motion sensing unit; and
a power supply unit;
wherein the LED load of the light-emitting unit includes a plurality of LEDs divided into two sets with a first set of N number LEDs and a second set of M number LEDs, wherein N and M are positive integers; wherein the first set of N number LEDs and the second set of M number LEDs are covered by a light diffuser to create a diffused light;
wherein the loading and power control unit includes a controller electrically coupled to the light sensing control unit, the motion sensing unit and at least two switching devices including a first switching device and a second switching device;
wherein the first switching device and the second switching device are connected with the first set of N number LEDs and the second set of M number LEDs;
wherein the two switching devices are controlled by the controller to be respectively conducting or cut-off to perform at least a first switching mode and a second switching mode;
wherein in the first switching mode at least the first set of N number LEDs is turned on to perform a low level illumination with a low light intensity and in the second switching mode at least the second set of M number LEDs is turned on to perform a high level illumination with a high light intensity;
wherein when an ambient light detected by the light sensing control unit is lower than a predetermined value, the loading and power control unit manages to turn on at least the first set of N number LEDs in the light-emitting unit to generate the low level illumination;
wherein when the ambient light detected by the light sensing control unit is higher than the predetermined value, the LED load is switched off;
wherein when a motion intrusion is detected by the motion sensing unit, the loading and power control unit manages to turn on at least the second set of M number LEDs in the light-emitting unit to generate the high level illumination for a predetermined duration; and
wherein the N number LEDs emit light with a low color temperature to produce a soft and warm light to feature an aesthetic night view around the living area both for indoor and outdoor need while at the same time create a navigation capacity similar to a light house to help people move to a destination without getting lost or encountering an accident, wherein the M number LEDs emit light with a high color temperature to produce a much brighter light with a dual effect of security alert by means of creating drastic changes in both light intensity from low to high and light color temperature from warm to cool upon detecting a motion intrusion, wherein the high level illumination with the high color temperature enables people to have a high visibility of the surrounding environment when needed; and wherein the plurality of LEDs of the first set of N number LEDs and the second set of M number LEDs in conjunction with a power level setting of the power supply unit are respectively designed with a configuration of in series and/or in parallel connections of LEDs such that an electric current passing through each LED of the light-emitting unit remains at an adequate level, and a voltage V across each LED complies with an operating constraint of $V_{th}<V<V_{max}$ featuring electrical characteristics of an LED; wherein $V_{th}$ is a threshold voltage required to trigger each LED to start emitting light and $V_{max}$ is a maximum operating voltage across each LED to avoid a thermal damage to LED construction.

16. The lifestyle two-level LED security light according to claim 15, wherein when the second set of M number LEDs is turned on upon detecting the motion intrusion, the loading and power control unit continues to turn on the first set of N number LEDs.

17. The lifestyle two-level LED security light according to claim 15, wherein when the second set of M number LEDs is turned on upon detecting the motion intrusion, the loading and power control unit manages to turn off the first set of N number LEDs.

18. The lifestyle two-level LED security light according to claim 15, wherein a total wattage of the M number LEDs is greater than a total wattage of the N number LEDs.

19. The lifestyle two-level LED security light according to claim 15, wherein a total wattage of the M number LEDs is equal to a total wattage of the N number LEDs.

20. The lifestyle two-level LED security light according to claim 15, wherein the power supply unit outputs a DC power for operating the lifestyle two-level LED security light, wherein the first set of N number LEDs and the second set of M number LEDs are connected in series, wherein a constant current control circuit is connected in series with the light-emitting unit such that an electric current level remains stable in light of a drastic change of lighting load between driving the N number LEDs for generating the low level illumination and driving at least the M number LEDs for generating the high level illumination.

21. The lifestyle two-level LED security light according to claim 20, wherein when the lifestyle two-level LED security is operated to generate the low level illumination, the low light intensity is further adjustable by the controller; wherein the first set of N number LEDs is configured to include a plurality of switching devices electrically coupled to the first set of N number LEDs and to the controller, wherein the controller is configured to control the number of LEDs to be turned on in the N number LEDs through bypassing unwanted LEDs in the N number LEDs with the associated switching device(s) according to an external control signal played by a user or according to a value of a voltage divider set by the user.

22. The lifestyle two-level LED security light according to claim 20, wherein when the two-level LED security is operated to generate the high level illumination, the high light intensity is further adjustable by the controller, wherein the second set of M number LEDs is configured to include a plurality of switching devices electrically coupled to the second set of M number LEDs and to the controller, wherein the controller is configured to control the number of LEDs to be turned on in the M number LEDs through bypassing unwanted LEDs in the M number LEDs with the associated switching device(s) according to an external control signal played by a user or according to a value of a voltage divider set by the user.

23. The lifestyle two-level LED security light according to claim 15, wherein the power supply unit outputs at least one DC power for operating the two-level LED security light; wherein the first set of N number LEDs and the second set of M number LEDs are connected in parallel, wherein the first switching device is electrically connected in series between the first set of N number LEDs and the power supply unit, wherein the second switching device is electrically connected in series between the second set of M number LEDs and the power supply unit.

24. The lifestyle two-level LED security light according to claim 23, wherein when the lifestyle two-level LED security light is operated to generate the low level illumination, the low light intensity of the low level illumination is further adjustable by the controller; wherein the controller in response to an external control signal played by a user outputs at least a PWM signal to control a time length of conduction period of at least the first switching device in each duty cycle such that an average electric current proportional to the time length of the conduction period is delivered to the light-emitting unit for performing a dimming work of the low level illumination.

25. The lifestyle two-level LED security light according to claim 23, wherein when the lifestyle two-level LED security light is operated to generate the high level illumination, the high light intensity of the high level illumination is further adjustable by the controller; wherein the controller in response to an external control signal played by a user outputs at least a PWM signal to control a time length of conduction period of at least the second switching device in each duty cycle such that an average electric current proportional to the time length of the conduction period is delivered to the light-emitting unit for performing a dimming work of the high level illumination.

26. The lifestyle two-level LED security light according to claim 23, wherein when the lifestyle two-level LED security light is operated to generate the high level illumination, the high light intensity of the high level illumination is further adjustable by the controller; wherein the controller in response to an external control signal played by a user outputs PWM signals to control time lengths of conduction period of both the first switching device and the second switching device in each duty cycle such that average electric currents proportional to the time lengths of the conduction period are delivered to the light-emitting unit for performing a dimming work of the high level illumination.

27. The lifestyle two-level LED security light according to claim 23, wherein when the lifestyle two-level LED security light is operated to generate the high level illumination, the high light intensity of the high level illumination is further adjustable by the controller, wherein the controller in response to the external control signal outputs PWM signals to control time lengths of conduction periods of both the first switching device and the second switching device varying with the same pace in a range for adjusting the high light intensity of the high level illumination.

28. The lifestyle two-level LED security light according to claim 23, wherein when the lifestyle two-level LED security light is operated to generate the low level illumination, a light color temperature of the low level illumination is further adjustable by the controller, wherein the controller in response to the external control signal outputs PWM signals to control time lengths of conduction periods of the first switching device and the second switching device to vary in a reverse manner such that a light intensity of the first set of N number LEDs with the low color temperature and a light intensity of the second set of M number LEDs with the high color temperature are reversely adjusted with the same pace to produce a variable mingled color temperature thru a light diffuser for performing a color temperature tuning of the low level illumination.

29. The lifestyle two-level LED security light according to claim 23, wherein when the lifestyle two-level LED security light is operated to generate the high level illumination, a light color temperature of the high level illumination is further adjustable by the controller, wherein the controller in response to the external control signal outputs PWM signals to control time lengths of conduction periods of the first switching device and the second switching device to vary in a reverse manner such that a light intensity of the first set of N number LEDs with the low color temperature and a light intensity of the second set of M number LEDs with the high color temperature are reversely adjusted with the same pace to produce a variable mingled color temperature thru a light diffuser for performing a color temperature tuning of the high level illumination.

30. The lifestyle two-level LED security light according to claim 23, wherein when the N number LEDs and the M number LEDs are both in conduction state, a light intensity of the N number LEDs and a light intensity of the M number LEDs are respectively adjustable, wherein the controller in response to an external control signal played by a user outputs a first PWM signal to control a first conduction rate of the first switching device and a second PWM signal to control a second conduction rate of the second switching device with an arrangement that the first conduction rate of the first switching device and the second conduction rate of the second switching device are reversely adjusted with the same pace such that a total electric power level transmitted to the N number LEDs and the M number LEDs is maintained at a constant level while a mingled color temperature of the light emitted by the N number LEDs and the light emitted by the M number LEDs thru a light diffuser is proportionately adjusted according to the external control signal to perform a color temperature tuning mode.

31. The lifestyle two-level LED security light according to claim 23, wherein when the N number LEDs and the M number LEDs are both in conduction state, a light intensity of the N number LEDs and a light intensity of the M number LEDs are respectively adjustable, wherein the controller in response to an external control signal played by an user outputs a first PWM signal to control a first conduction rate of the first switching device and a second PWM signal to control a second conduction rate of the second switching device with an arrangement that the first conduction rate of the first switching device and the second conduction rate of the second switching device are unidirectionally and proportionally adjusted with the same pace such that a mingled color temperature of the light emitted by the N number LEDs and the light emitted by the M number LEDs thru a light diffuser is maintained at a constant level while a light intensity of the light-emitting unit is being proportionately adjusted according to the external control signal to perform a dimming mode.

32. The lifestyle two-level LED security light according to claim 23, wherein when the N number LEDs and the M number LEDs are in conduction state, light intensity and light color temperature are both adjustable for performing a dimming and color temperature tuning control mode, wherein the controller in response to an external control signal played by a user outputs a second PWM signal to control a second conduction rate of the second switching device such that the M number LEDs with the high color temperature are dimmed according to the external control signal, wherein the controller manages to output a first PWM signal to control a first conduction state of the first switching device such that the N number LEDs with the low color temperature operates a constant power while the M number LEDs are being dimmed to create a dim to warm effect, wherein during a cycle of the dimming and color temperature tuning control mode, a light intensity and a light color temperature of the light-emitting unit are jointly determined by the external control signal.

33. The lifestyle two-level LED security light according to claim 32, wherein when the M number LEDs are dimmed to a cutoff state, the controller operates to change the first PWM signal to continuously reduce the first conduction rate of the first switching device such that the light intensity of the light-emitting unit continues to decrease with the low color temperature.

34. The lifestyle two-level LED security light according to claim 23, wherein when the N number LEDs and the M number LEDs are in conduction state, light intensity and light color temperature are both adjustable for performing a dimming and color temperature tuning control mode, wherein the controller in response to an external control signal outputs a first PWM signal to control a first conduction rate of the first switching device and a second PWM signal to control a second conduction rate of the second switching device, wherein the first PWM signal and the second PWM signal are configured to operate with an arrangement that the M number LEDs and the N number LEDs are respectively dimmed in such a way that the M number LEDs leads the N number LEDs in reaching a turned off state in performing the dimming and color temperature tuning control mode such that a mingled color temperature of the light emitted by the N number LEDs and the light emitted by the M number LEDs continues to change to a warmer illumination along with a continuous reduction of light intensity to create a dim to warm effect according to the external control signal, wherein during a cycle of the dimming and color temperature turning control mode, a light intensity and a light color temperature of the light-emitting unit are jointly determined by the external control signal.

35. The lifestyle two-level LED security light according to claim 23, wherein when the N number LEDs and the M number LEDs are in conduction state, a light intensity and a light color temperature are both adjustable for performing a dimming and color temperature tuning control mode, wherein the controller in response to an external control signal outputs a first PWM signal to control a first conduction rate of the first switching device and a second PWM signal to control a second conduction rate of the second switching device, wherein the first PWM signal and the second PWM signal are configured to operate with an arrangement that the M number LEDs and the N number LEDs are respectively dimmed in such a way that the M number LEDs leads the N number LEDs in reaching a turned off state; wherein in order to accelerate color temperature tuning pace along with a continuous reduction of light intensity, the first PWM signal initially manages to increase the conduction rate of the first switching device with a pace slower than the reduction pace of the conduction rate of the second switching device such that a mingled color temperature continues to change to a warmer illumination at a faster pace to perform a faster dim to warm process, wherein when a dim to warm process ceases at a time point when the M number LEDs reaches a turned off state is an inflection time point, the first PWM signal to reversely manage to decrease the conduction rate of the first switching device till the N number LEDs reaching the turned off state in performing the dimming and color temperature tuning control mode such that a mingled color temperature of the light emitted by the N number LEDs and the light emitted by the M number LEDs continues to change to a warmer illumination along with a continuous reduction of light intensity to create a dim to warm effect according to the external control signal, wherein during a cycle of the dimming and color temperature turning control mode, a light intensity and a light color temperature of the light-emitting unit are jointly determined by the external control signal.

36. The lifestyle two-level LED security light according to claim 15, wherein when each of the first set of N number LEDs and the second set of M number LEDs is configured with a plurality of LEDs electrically connected in series or sets of in parallel connected LEDs electrically connected in series, a working voltage across each of the first set of N number LEDs and the second set of the M number LEDs is confined in a domain between a minimum voltage equal to the sum of the threshold voltages of all LEDs electrically connected in series or sets of in parallel connected LEDs electrically connected in series and a maximum voltage equal to the sum of the maximum voltages of all LEDs electrically connected in series or sets of in parallel connected LEDs electrically connected in series.

37. The lifestyle two-level LED security light according to claim 36, wherein the LED has the voltage V across each LED complying with an operating constraint of 2.5 volts $<V_{th}<V<V_{max}<$3.5 volts and the first set of N number LEDs and the second set of M number LEDs are required to operate with respective operating voltages $V_N$ and $V_M$ confined in domains expressed by $N_S \times 2.5$ volts $<V_N<N_S \times 3.5$ volts and $M_S \times 2.5$ volts $<V_M<M_S \times 3.5$ volts, with $N_S$ and $M_S$ respectively denoting the numbers of series connected LEDs in the first set of N number LEDs and the second set of M number LEDs, wherein $N_S \leq N$ and $M_S \leq M$.

38. A two-level LED security light comprising:
a light-emitting unit;
a loading and power control unit;
a light sensing control unit;
a power supply unit; and
at least one external control unit;
wherein the light-emitting unit comprises a plurality of LEDs divided into two sets of LEDs with a first set of N number LEDs emitting light with a low color temperature and a second set of M number LEDs emitting light with a high color temperature, wherein N and M are positive integers; wherein the first set of N number LEDs and the second set of M number LEDs are covered by a light diffuser to create a diffused light;
wherein the loading and power control unit comprises a controller and a switching circuitry, wherein the controller is electrically coupled to the light sensing control unit, the switching circuitry and the at least one external control unit;
wherein the switching circuitry is electrically coupled between at least one power source of the power supply unit and the light-emitting unit;
wherein the switching circuitry is controlled by the controller to perform at least respectively a first switching mode and a second switching mode according to signals respectively received from the light sensing control unit and the at least one external control unit;
wherein in the first switching mode at least the first set of the light-emitting unit is turned on to perform a first illumination mode and in the second switching mode at least the second set of the light-emitting unit is turned on to perform a second illumination mode;
wherein when an ambient light detected by the light sensing control unit is lower than a first predetermined value, the loading and power control unit manages to perform at least one of the first illumination mode and the second illumination mode;
wherein when the ambient light detected by the light sensing control unit is higher than a second predetermined value, the loading and power control unit manages to turn off all the LEDs in the light-emitting unit;
wherein the at least one external control unit is electrically coupled to the controller for adjusting at least one operating parameter of a light intensity of the first illumination mode or a light intensity of the second illumination mode or for switching from the first illumination mode to the second illumination mode; and
wherein the N number LEDs of the first set of the light-emitting unit and the M number LEDs of the second set of the light-emitting unit are respectively designed with a configuration of in series and/or in parallel connections such that when incorporated with a power level setting of the power supply unit an electric current passing through each LED of the M number LEDs and each LED of the N number LEDs remains at an adequate level such that a voltage V across each LED complies with an operating constraint of $V_{th}<V<V_{max}$ featuring electrical characteristics of a LED, where $V_{th}$ is a threshold voltage required to trigger the LED to start emitting light and $V_{max}$ is a maximum operating voltage across the LED to avoid a thermal damage or burning out of LED construction.

39. The two-level LED security light according to claim 38, wherein when each of the first set of N number LEDs and the second set of M number LEDs is configured with a plurality of LEDs electrically connected in series or sets of in parallel connected LEDs electrically connected in series, a working voltage across each of the first set of N number LEDs and the second set of M number LEDs is confined in a domain between a minimum voltage equal to the sum of the threshold voltages of all LEDs electrically connected in series or sets of in parallel connected LEDs electrically connected in series and a maximum voltage equal to the sum of the maximum voltages of all LEDs electrically connected in series or sets of in parallel connected LEDs electrically connected in series.

40. The two-level LED security light according to claim 39, wherein the LED has the voltage V across each LED complying with an operating constraint of 2.5 volts $<V_{th}<V<V_{max}<$3.5 volts and the first set of N number LEDs and the second set of M number LEDs are required to operate with respective operating voltages $V_N$ and $V_M$ confined in domains expressed by $N_S \times 2.5$ volts $<V_N<N_S \times 3.5$ volts and $M_S \times 2.5$ volts $<V_M<M_S \times 3.5$ volts, with $N_S$ and $M_S$ respectively denoting the numbers of series connected LEDs in the first set of N number LEDs and the second set of M number LEDs, wherein $N_S \leq N$ and $M_S \leq M$.

41. The two-level LED security light according to claim 38, wherein the at least one external control unit is a power interruption detection circuitry electrically coupled to the controller for detecting a short power interruption signal; wherein when the short power interruption signal is detected, the controller operates to alternately perform one of the first illumination mode and the second illumination mode; wherein the first illumination mode is a low level illumination mode with the low color temperature and the second illumination mode is a high level illumination mode with the high color temperature.

42. The two-level LED security light according to claim 38, wherein the at least one external control unit is a power interruption detection circuitry electrically coupled to the controller for detecting a short power interruption signal;

wherein when the short power interruption signal is detected, the controller operates to alternately perform at least one of a first illumination mode, a second illumination mode and a third illumination mode; wherein when the first illumination mode is performed, the loading and power control unit manages to turn on only the first set of the light-emitting unit, wherein when the second illumination mode is performed, the loading and power control unit manages to turn on only the second set of the light-emitting unit, wherein when the third illumination mode is performed, the loading and power control unit manages to turn on the first set of the light-emitting unit with a reduced illumination by decreasing an electric power delivered to the first set of the light-emitting unit.

43. The two-level LED security light according to claim 38, wherein the at least one external control unit is a power interruption detection circuitry electrically coupled to the controller for detecting a short power interruption signal; wherein when the short power interruption signal is detected, the controller operates to alternately perform at least one of a first illumination mode, a second illumination mode and a third illumination mode; wherein when the first illumination mode is performed, the loading and power control unit manages to turn on only the first set of the light-emitting unit to perform the low level illumination mode emitting light with the low color temperature, wherein when the second illumination mode is performed, the loading and power control unit manages to turn on only the second set of the light-emitting unit to perform the high level illumination mode emitting light with the high color temperature; wherein when the third illumination mode is performed, the loading and power control unit manages to reduce a first light intensity of the first set of the light-emitting unit and a second light intensity of the second set of the light-emitting unit respectively with the same pace such that the light-emitting unit accordingly performs a medium mingled color temperature.

44. A two-level LED security light comprising:
a light-emitting unit configured with at least a first LED load for emitting light with a low color temperature and at least a second LED load for emitting light with a high color temperature;
a diffuser covering the first LED load and the second LED load to create a diffused light with a mingled color temperature;
a loading and power control unit;
a light sensing control unit;
a motion sensing unit;
a power supply unit; and
at least one external control unit;
wherein the loading and power control unit comprises a controller and a switching circuitry, wherein the controller is electrically and respectively coupled with the light sensing control unit, the motion sensing unit, the switching circuitry and the at least one external control unit;
wherein the switching circuitry is electrically coupled between a power source of the power supply unit and the light-emitting unit, wherein the power source is a DC power source configured in the power supply unit;
wherein the switching circuitry comprises at least one semiconductor switching device;
wherein the first LED load and the second LED load are connected in parallel and are further respectively and electrically coupled to the switching circuitry;
wherein the controller outputs control signals to control different conduction rates of the switching circuitry for delivering different electric powers from the power source respectively to the first LED load and the second LED load of the light emitting unit such that the light-emitting unit respectively generates illuminations of different light intensities and different mingled color temperatures for performing different illumination modes according to signals respectively received from the light sensing control unit, the motion sensing unit and the at least one external control unit;
wherein when an ambient light detected by the light sensing control unit is lower than a first predetermined value, at least the first LED load is switched on;
wherein the controller outputs at least a first control signal to control at least a first conduction rate of the switching circuitry such that a low electric power is delivered to the light-emitting unit to perform a low level illumination mode emitting light with a low light intensity and a low mingled color temperature;
wherein when the ambient light detected by the light sensing control unit is higher than a second predetermined value, the light-emitting unit including the first LED load and the second LED load is switched off;
wherein when a motion signal is detected by the motion sensing unit, at least the second LED load is switched on by the loading and power control unit, wherein the controller outputs at least a second control signal to control at least a second conduction rate of the switching circuitry such that a high electric power is delivered to the light-emitting unit to perform a high level illumination mode emitting light with a high light intensity and a high mingled color temperature for a predetermined time duration before switching back to the low level illumination mode;
wherein the at least one external control unit generates at least one external control signal for adjusting or selecting at least one operating parameter including the light intensity of the low level illumination mode and the mingled color temperature of the low level illumination mode, the light intensity of the high level illumination mode, the mingled color temperature of the high level illumination mode and a time length of the predetermined time duration;
wherein the LEDs of the first LED load and the LEDs of the second LED load are respectively designed with a configuration of in series and/or in parallel connections such that when incorporated with an adequate level setting of the power source an electric current passing through each LED of the first LED load and each LED of the second LED load remains at an adequate level such that a voltage V across each LED complies with an operating constraint of $V_{th}<V<V_{max}$ featuring electrical characteristics of an LED, where $V_{th}$ is a threshold voltage required to trigger the LED to start emitting light and $V_{max}$ is a maximum operating voltage across the LED to avoid a thermal damage or burning out of LED construction.

45. The two-level LED security light according to claim 44, wherein when each of the first LED load and the second LED load is configured with a plurality of LEDs electrically connected in series or sets of in parallel connected LEDs electrically connected in series, a working voltage across the first LED load or the second LED load is confined in a domain between a minimum voltage equal to the sum of the threshold voltages of all LEDs electrically connected in series or sets of in parallel connected LEDs electrically connected in series and a maximum voltage equal to the sum of the maximum voltages of all LEDs electrically connected in series or sets of in parallel connected LEDs electrically connected in series.

46. The two-level LED security light according to claim 45, wherein the LED has the voltage V across each LED complying with an operating constraint of 2.5 volts $<V_{th}<V<V_{max}<3.5$ volts and the working voltages imposed on the first LED load and the second LED load respectively represented by $V_N$ and $V_M$ are confined in domains expressed by N×2.5 volts $<V_N<$N×3.5 volts and M×2.5 volts $<V_M<$M×3.5 volts, wherein N and M are positive integrals denoting respective numbers of series connected LEDs in the first LED load and the second LED load.

47. The two-level LED security light according to claim 44, wherein when the light-emitting unit is operated in the low level illumination mode, the light intensity of the first LED load and the light intensity of the second LED load are respectively adjustable to tune the mingled color temperature of the diffused light created thru the light diffuser; wherein upon receiving the at least one external control signal from the at least one external control unit the controller operates in response to simultaneously but reversely adjust the light intensity of the first LED load and the light intensity of the second LED load with the same pace; wherein for changing to a lower mingled color temperature, the controller upon receiving the at least one external control signal operates to control the switching circuitry to increase a first electric power delivered to the first LED load and at the same time to decrease a second electric power delivered to the second LED lighting load; wherein for changing to a higher mingled color temperature, the controller upon receiving the external control signal operates to control the switching circuitry to decrease the first electric power delivered to the first LED lighting load and at the same time to increase the second electric power delivered to the second LED lighting load such that a sum of the first electric power and the second electric power remains unchanged and is equal to the low electric power in the low level illumination mode.

48. The two-level LED security light according to claim 44, wherein when the light-emitting unit is operated in the high level illumination mode, the light intensity of the first LED load and the light intensity of the second LED load are respectively adjustable to tune the mingled color temperature of the diffused light created thru the light diffuser; wherein upon receiving the at least one external control signal from the at least one external control unit the controller operates in response to simultaneously but reversely adjust the light intensity of the first LED load and the light intensity of the second LED load with the same pace; wherein for changing to a lower mingled color temperature, the controller upon receiving the at least one external control signal operates to control the switching circuitry to increase a first electric power delivered to the first LED load and at the same time to decrease a second electric power delivered to the second LED load such that a sum of the first electric power and the second electric power remains unchanged; wherein for changing to a higher mingled color temperature, the controller upon receiving the external control signal operates to control the switching circuitry to decrease the first electric power delivered to the first LED load and at the same time to increase the second electric power delivered to the second LED load such that the sum of the first electric power and the second electric power remains unchanged and is equal to the high electric power in the high level illumination mode.

49. The two-level LED security light according to claim 44, wherein the controller is programmed to operate with at least one color temperature switching scheme for selecting the mingled color temperature of the low level illumination mode or the mingled color temperature of the high level illumination mode, wherein paired combinations of different conduction rates of the switching circuitry for controlling different electric powers to be respectively delivered to the first LED load and the second LED load for creating different mingled color temperatures are preprogrammed and stored in a memory unit addressable by the controller for operating a pick and play process according to the at least one external control signal received and interpreted by the controller for performing a selected mingled color temperature; wherein in programming the paired combinations of different conduction rates of the switching circuitry, a first electric power delivered to the first LED load and a second electric power delivered to the second LED load are complementarily and reversely adjusted such that a total of the first electric power delivered to the first LED load and the second electric power delivered to the second LED load remain essentially unchanged.

50. The two-level LED security light according to claim 49, wherein the at least one external control unit includes at least one voltage divider and the at least one external control signal is a voltage output of the voltage divider set by a user, for selecting a color temperature performance of the at least one color temperature tuning scheme.

51. The two-level LED security light according to claim 49, wherein the at least one external control unit includes at least one push button or one touch pad and the at least one external control signal is a short voltage signal with a time length corresponding to a time duration of the push button or the touch pad being operated by a user, wherein upon receiving the short voltage signal the controller operates the pick and play process to alternately perform a selected mingled light color temperatire in the color temperature switching scheme according to a preset sequence.

52. The two-level LED security light according to claim 49, wherein the at least one external control unit is a wireless remote control receiver and the at least one external control signal is a wireless signal transmitted from a mobile device.

53. The two-level LED security light according to claim 49, wherein in tuning the mingled color temperature the controller operates to simultaneously but reversely adjust the light intensity of the first LED load and the light intensity of the second LED load with an arrangement that a total electric power of the light-emitting unit is kept essentially unchanged during adjusting process.

54. The two-level LED security light according to claim 49, wherein the at least one external control unit is a power interruption detection circuitry electrically coupled to the controller for detecting a short power interruption signal; wherein when the short power interruption signal is detected, the controller operates to alternately switch a selection of different mingled color temperatures according to the at least one color temperature tuning scheme preprogrammed.

55. A lifestyle LED security light comprising:
  a light-emitting unit, configured with at least a first LED load for emitting light with a low color temperature and at least a second LED load for emitting light with a high color temperature;
  a diffuser covering the first LED load and the second LED load to create a diffused light with a mingled color temperature;
  a loading and power control unit;

a light sensing control unit;
a motion sensing unit;
a power supply unit; and
at least one external control unit;
wherein the loading and power control unit comprises a controller and a switching circuitry, wherein the controller is electrically and respectively coupled with the light sensing control unit, the motion sensing unit, the switching circuitry and the at least one external control unit;
wherein the switching circuitry is electrically coupled between a power source of the power supply unit and the light-emitting unit, wherein the power source is a DC power source configured in the power supply unit;
wherein the switching circuitry comprises at least a first semiconductor switching device and at least a second semiconductor switching device;
wherein the first LED load and the second LED load are connected in parallel and are further respectively and electrically coupled to the first semiconductor switching device and the second semiconductor switching device;
wherein the controller outputs a first control signal to control a first conduction rate of the first semiconductor switching device for delivering a first electric power to the first LED load and simultaneously a second control signal to control a second conduction rate of the second semiconductor switching device for delivering a second electric power to the second LED load such that the light-emitting unit respectively generates illuminations of different light intensities and different mingled color temperatures for performing different illumination modes according to signals respectively received from the light sensing control unit, the motion sensing unit and the at least one external control unit;
wherein when an ambient light detected by the light sensing control unit is lower than a first predetermined value, the light-emitting unit is switched on to perform a first illumination mode with the motion sensing unit being temporarily deactivated;
wherein the controller outputs at least the first control signal to control at least the first conduction rate of at least the first semiconductor switching device such that a total electric power is delivered to the light-emitting unit to perform the first illumination mode with a first level illumination characterized by a first light intensity and a first mingled color temperature for a first predetermined time duration;
wherein upon a maturity of the first predetermined time duration the loading and power control unit manages to cutoff the total electric power delivered to the light-emitting unit and at the same time the motion sensing unit is activated;
wherein when a motion signal is detected by the motion sensing unit, the controller operates to output at least the second control signal to control at least the second conduction rate of at least the second semiconductor switching device to increase the total electric power delivered to the light-emitting unit to perform a second illumination mode with a second level illumination characterized by a second light intensity and a second mingled color temperature for a second predetermined time duration before being switched back to the turned off state, wherein the second light intensity of the second level illumination is equal to or higher than the first light intensity of the first level illumination;
wherein when the ambient light detected by the light sensing control unit is higher than a second predetermined value, the light-emitting unit including the first LED load and the second LED load is switched off;
wherein the at least one external control unit is a voltage divider, a push button, a touch pad, a wireless signal receiver or a power interruption detection circuitry, generating at least one external control signal to the controller for adjusting or selecting at least one operating parameter of the light-emitting unit including the light intensity, the mingled color temperature, a time length for the first predetermined time duration or a time length for the second predetermined time duration respectively in the first illumination mode or in the second illumination mode;
wherein the LEDs of the first LED load and the LEDs of the second LED load are respectively designed with a configuration of in series and/or in parallel connections such that when incorporated with an adequate level setting of the power source of the power supply unit an electric current passing through each LED of the first LED load and each LED of the second LED load remains at an adequate level such that a voltage V across each LED chip complies with an operating constraint of $V_{th}<V<V_{max}$ featuring electrical characteristics of the LED chip, where $V_{th}$ is a threshold voltage required to trigger the LED to start emitting light and $V_{max}$ is a maximum operating voltage across the LED to avoid a thermal damage or burning out of LED construction.

56. The lifestyle LED security light according to claim 55, wherein when each of the first LED load and the second LED load is configured with a plurality of LEDs electrically connected in series or sets of in parallel connected LEDs electrically connected in series, a working voltage across the first LED load or the second LED load is confined in a domain between a minimum voltage equal to the sum of the threshold voltages of all LEDs electrically connected in series or sets of in parallel connected LEDs electrically connected in series and a maximum voltage equal to the sum of the maximum voltages of all LEDs electrically connected in sereis or sets of in parallel connected LEDs electrically connected in series.

57. The lifestyle LED security light according to claim 56, wherein the LED has the voltage V across each LED complying with an operating constraint of 2.5 volts $<V_{th}<V<V_{max}<3.5$ volts and the working voltages imposed on the first LED load and the second LED load respectively represented by $V_N$ and $V_M$ are confined in domains expressed by N×2.5 volts $<V_N<$N×3.5 volts and M×2.5 volts $<V_M<$M×3.5 volts, wherein N and M are positive integrals denoting respective numbers of series connected LEDs in the first LED load and in the second LED load.

58. The lifestyle LED security light according to claim 55, wherein the first mingled color temperature of the first level illumination in performing the first illumination mode is the low color temperature, wherein the second semiconductor switching device is in a cutoff state and the controller outputs only the first control signal to control the first conduction rate of the first semiconductor switching device to deliver the total electric power to the light-emitting unit to determine the light intensity of the first illumination mode.

59. The lifestyle LED security light according to claim 55, wherein the second mingled color temperature of the second level illumination in performing the second illumination mode is the high color temperature, wherein the first semiconductor switching device is in a cutoff state and the controller outputs only the second control signal to control the second conduction rate of the second semiconductor switching device to deliver the total electric power to the light-emitting unit to determine the light intensity of the second illumination mode.

60. The lifestyle LED security light according to claim 55, wherein when the light-emitting unit is in the first illumination mode, a light intensity of the first LED load and a light intensity of the second LED load are respectively adjustable to tune the mingled color temperature of the diffused light created thru the light diffuser; wherein upon receiving an external control signal from the external control unit the controller operates to simultaneously but reversely adjust the light intensity of the first LED load and the light intensity of the second LED load with the same pace; wherein for changing to a lower mingled color temperature, the controller upon receiving the external control signal operates to control the first semiconductor switching device to increase the first electric power delivered to the first LED load and at the same time operates to control the second semiconductor switching device to proportionally decrease the second electric power delivered to the second LED load; wherein for changing to a higher mingled color temperature, the controller upon receiving the external control signal operates to control the first semiconductor switching device to decrease the first electric power delivered to the first LED load and at the same time operates to control the second semiconductor switching device to proportionally increase the second electric power delivered to the second LED load.

61. The lifestyle LED security light according to claim 60, wherein when the light-emitting unit is in the first illumination mode, the controller is programmed to operate with a color temperature swictching scheme, wherein paired combinations of different conduction rates between operating the first semiconductor switching device and the second semiconductor switching device for controlling the first electric power and the second electric power respectively delivered to the first LED load and the second LED load for creating different mingled color temperatures are preprogrammed and stored in a memory unit addressable by the controller for operating a pick and play process according to the at least one external control signal received and interpreted by the controller for performing a selected mingled color temperature.

62. The lifestyle LED security light according to claim 55, wherein when the light-emitting unit is in the second illumination mode, the light intensity of the first LED load and the light intensity of the second LED load are respectively adjustable to tune the mingled color temperature thru the light diffuser; wherein upon receiving an external control signal from the at least one external control unit the controller operates to simultaneously but reversely adjust the light intensity of the first LED load and the light intensity of the second LED load with the same pace; wherein for changing to a lower mingled color temperature, the controller upon receiving the external control signal operates to control the first semiconductor switching device to increase the first electric power delivered to the first LED load and at the same time operates to control the second semiconductor switching device to proportionally decrease the second electric power delivered to the second LED load; wherein for changing to a higher mingled color temperature, the controller upon receiving the external control signal operates to control the first semiconductor switching device to decrease the first electric power delivered to the first LED load and at the same time operates to control the second semiconductor switching device to proportionally increase the second electric power delivered to the second LED load.

63. The lifestyle LED security light according to claim 62, wherein when the light-emitting unit is in the second illumination mode, the controller is programmed to operate with a color temperature switching scheme, wherein paired combinations of different condcution rates between operating the first semiconductor switching device and the second semiconductor switching device for controlling the first electric power and the second electric to be respectively delivered to the first LED load and the second LED load for creating different mingled color temperatures are preprogrammed and stored in a memory unit addressable by the controller for operating a pick and play process according to the external control signal received and interpreted by the controller for performing a selected mingled color temperature.

64. The lifestyle LED security light according to claim 62, wherein the at least one external control unit includes at least one voltage divider and the at least one external control signal is a voltage output of the voltage divider set by a user, for activating the pick and play process for selecting a corresponding mingled color temperature performance in the at least one color temperature tuning scheme.

65. The lifestyle LED security light according to claim 63, wherein the at least one external control unit includes at least one voltage divider and the at least one external control signal is a voltage output of the voltage divider set by a user, for activating the pick and play process for selecting a corresponding mingled color temperature performance in the at least one color temperature tuning scheme.

66. The lifestyle LED security light according to claim 61, wherein the at least one external control unit includes at least one wireless signal receiver to receive a wireless external control signal from a mobile device, a smart phone or a smart speaker for activating the pick and play process for selecting a corresponding mingled color temperature performance in the at least one color temperature switching scheme.

67. A lifestyle LED security light comprising:
a light-emitting unit, configured with at least a first LED load for emitting light with a low color temperature and at least a second LED load for emitting light with a high color temperature;
a diffuser covering the first LED load and the second LED load to create a diffused light with a mingled color temperature;
a loading and power control unit;
a light sensing control unit;
a motion sensing unit;
a power supply unit; and
at least one external control unit; and
wherein the loading and power control unit comprises a controller and a switching circuitry, wherein the controller is electrically and respectively coupled with the light sensing control unit, the motion sensing unit, the switching circuitry and the at least one external control unit;
wherein the switching circuitry is electrically coupled between at least one power source of the power supply unit and the light-emitting unit, wherein the power source is a DC power source configured in the power supply unit;
wherein the switching circuitry comprises at least a first semiconductor switching device and a second semiconductor switching device;

wherein the first LED load and the second LED load are connected in parallel and are further respectively and electrically coupled to the first semiconductor switching device and the second semiconductor switching device;

wherein the controller outputs a first control signal to control a first conduction rate of the first semiconductor switching device for delivering a first electric power to the first LED load and simultaneously a second control signal to control a second conduction rate of the second semiconductor switching device for delivering a second electric power to the second LED load such that the light-emitting unit respectively generates illuminations of different light intensities and different mingled color temperatures for performing different illumination modes according to signals respectively received from the light sensing control unit, the motion sensing unit and the at least one external control unit;

wherein when an ambient light detected by the light sensing control unit is lower than a first predetermined value, the light-emitting unit is switched on to perform a first illumination mode with the motion sensing unit being temporarily deactivated; wherein the controller outputs at least the first control signal to control at least the first conduction rate of at least the first semiconductor switching device such that a total electric power is delivered to the light-emitting unit to perform the first illumination mode with a first level illumination characterized by a first light intensity and a first mingled color temperature for a first predetermined time duration;

wherein upon a maturity of the first predetermined time duration the loading and power control unit manages to reduce the total electric power delivered to the light-emitting unit to generate a low level illumination characterized by a low light intensity and at the same time the motion sensing unit is activated;

wherein when a motion signal is detected by the motion sensing unit, the controller operates to output at least the second control signal to control at least the second conduction rate of at least the second semiconductor switching device to increase the total electric power delivered to the light-emitting unit to perform a second illumination mode with a second level illumination characterized by a second light intensity and a second mingled color temperature for a second predetermined time duration before being switched back to the low level illumination, wherein the second light intensity of the second level illumination is equal to or higher than the first light intensity of the first level illumination, wherein the first light intensity is equal to or higher than the low light intensity of the low level illumination;

wherein when the ambient light detected by the light sensing control unit is higher than a second predetermined value, the light-emitting unit including the first LED load and the second LED load is switched off;

wherein the at least one external control unit is a voltage divider, a push button, a touch pad, a wireless signal receiver or a power interruption detection circuitry, generating at least one external control signal for adjusting or selecting at least one operating parameter of the light-emitting unit including the light intensity, the mingled color temperature, a time length for the first predetermined time duration or a time length for the second predetermined time duration respectively in the first illumination mode or in the second illumination mode;

wherein the LEDs of the first LED load and the LEDs of the second LED load are respectively designed with a configuration of in series and/or in parallel connections such that when incorporated with an adequate level setting of the power source of the power supply unit an electric current passing through each LED of the first LED load and each LED of the second LED load remains at an adequate level such that a voltage V across each LED complies with an operating constraint of $V_{th}<V<V_{max}$ featuring electrical characteristics of a LED, where $V_{th}$ is a threshold voltage required to trigger the LED to start emitting light and $V_{max}$ is a maximum operating voltage across the LED to avoid a thermal damage or burning out of LED construction.

68. The lifestyle LED security light according to claim 67, wherein when each of the first LED load and the second LED load is configured with a plurality of LEDs electrically connected in series or sets of in parallel connected LEDs electrically connected in series, a working voltage across the first LED load or the second LED load is confined in a domain between a minimum voltage equal to the sum of the threshold voltages of all LEDs electrically connected in series or sets of in parallel connected LEDs electrically connected in series and a maximum voltage equal to the sum of the maximum voltages of all LEDs electrically connected in series or sets of in parallel connected LEDs electrically connected in series.

69. The lifestyle LED security light according to claim 68, wherein the LED has the voltage V across each LED complying with an operating constraint of 2.5 volts $<V_{th}<V<V_{max}<3.5$ volts and the working voltages imposed on the first LED load and the second LED load respectively represented by $V_N$ and $V_M$ are confined in domains expressed by N×2.5 volts $<V_N<$N×3.5 volts and M×2.5 volts $<V_M<$M×3.5 volts, wherein N and M are positive integrals denoting respective numbers of series connected LEDs in the first LED load and the second LED load.

70. The lifestyle LED security light according to claim 67, wherein the first mingled color temperature in performing the first illumination mode is the low color temperature, wherein the second semiconductor switching device is in a cutoff state and the controller outputs only the first control signal to control the first conduction rate of the first semiconductor switching device to deliver the total electric power to the light-emitting unit to determine the light intensity and the mingled color temperature of the first illumination mode.

71. The lifestyle LED security light according to claim 67, wherein the second mingled color temperature in performing the second illumination mode is the high color temperature, wherein the first semiconductor switching device is in a cutoff state and the controller outputs only the second control signal to control the second conduction rate of the second semiconductor switching device to deliver the total electric power to the light-emitting unit to determine the light intensity of the second illumination mode.

72. The lifestyle LED security light according to claim 67, wherein when the light-emitting unit is in the first illumination mode, a light intensity of the first LED lighting load and a light intensity of the second LED lighting load are respectively adjustable to tune the mingled color temperature of the diffused light thru the light diffuser; wherein upon receiving an external control signal from the at least one external control unit the controller operates to simultaneously but reversely adjust the light intensity of the first LED lighting load and the light intensity of the second LED lighting load with the same pace; wherein for changing to a lower mingled color temperature, the controller upon receiving the external control signal operates to control the first semiconductor switching device to increase the first electric power delivered to the first LED load and at the same time proportionally decrease the second electric power delivered to the second LED load; wherein for changing to a higher mingled color temperature, the controller upon receiving the external control signal operates to control the first semiconductor switching device to decrease the first electric power delivered to the first LED load and at the same time proportionally increase the second electric power delivered to the second LED load.

73. The lifestyle LED security light according to claim 72, wherein when the light-emitting unit is in the first illumination mode, the controller is programmed to operate with a color temperature tuning scheme, wherein paired combinations of different conduction rates between operating the first semiconductor switching device and the second semiconductor switching device for controlling the first electric power and the second electric power respectively delivered to the first LED load and the second LED load for creating different mingled color temperatures are preprogrammed and stored in a memory unit addressable by the controller for operating a pick and play process according to the external control signal received and interpreted by the controller for performing a selected mingled color temperature.

74. The lifestyle LED security light according to claim 67, wherein when the light-emitting unit is in the second illumination mode, a light intensity of the first LED lighting load and a light intensity of the second LED lighting load are respectively adjustable to tune the mingled color temperature thru the light diffuser; wherein upon receiving an external control signal from the at least one external control unit the controller operates to simultaneously but reversely adjust the light intensity of the first LED lighting load and the light intensity of the second LED lighting load with the same pace; wherein for changing to a lower mingled color temperature, the controller upon receiving the external control signal operates to control the first semiconductor switching device to increase the first electric power delivered to the first LED load and at the same time operates to control the second semiconductor switching device to proportionally decrease the second electric power delivered to the second LED load; wherein for changing to a higher mingled color temperature, the controller upon receiving the external control signal operates to control the first semiconductor switching device to decrease the first electric power delivered to the first LED load and at the same time operates to control the second semiconductor switching device to proportionally increase the second electric power delivered to the second LED load.

75. The lifestyle LED security light according to claim 74, wherein when the light-emitting unit is in the second illumination mode, the controller is programmed to operate with a color temperature tuning scheme, wherein paired combinations of different conduction rates between operating the first semiconductor switching device and the second semiconductor switching device for controlling the first electric power and the second electric power respectively delivered to the first LED load and the second LED load for creating different mingled color temperatures are preprogrammed and stored in a memory unit addressable by the controller for operating a pick and play process according to the external control signal received and interpreted by the controller for performing a selected mingled color temperature.

76. The lifestyle LED security light according to claim 73, wherein the at least one external control unit includes at least one voltage divider and the at least one external control signal is a voltage output of the voltage divider set by a user, for activating the pick and play process for selecting a corresponding mingled color temperature performance in the at least one color temperature tuning scheme.

77. The lifestyle LED security light according to claim 75, wherein the at least one external control unit includes at least one voltage divider and the at least one external control signal is a voltage output of the voltage divider set by a user, for activating the pick and play process for selecting a corresponding mingled color temperature performance in the at least one color temperature tuning scheme.

78. The lifestyle LED security light according to claim 73, wherein the at least one external control unit include at least one wireless signal receiver to receive a wireless external control signal from a mobile device, a smart phone or a smart speaker for activating the pick and play process for selecting a corresponding mingled color temperature performance in the at least one color temperature switching scheme.

79. A lifestyle LED security light, comprising:
a light-emitting unit, including at least a first LED load configured with a plurality of LEDs emitting light with a first color temperature;
a loading and power control unit;
a light sensing control unit;
a motion sensing unit;
a time setting unit; and
a power supply unit;
wherein the loading and power control unit comprises a controller and a switching circuitry, wherein the controller is electrically coupled with the light sensing control unit, the motion sensing unit, the switching circuitry and the time setting unit, wherein the switching circuitry is electrically connected between a power source and the light-emitting unit to control and output an electric power to the light-emitting unit, wherein the switching circuitry comprises at least a first semiconductor switching device, wherein the controller outputs a control signal to control a conduction rate of the switching circuitry for delivering different electric powers from the power source to drive the light-emitting unit for generating different illuminations characterized by different light intensities according to signals respectively received from the light sensing control unit and the motion sensing unit;
wherein the power source configured in the power supply unit outputs at least a DC power for operating the LED lighting device;
wherein the control signals are pulse width modulation signals;
wherein when an ambient light detected by the light sensing control unit is lower than a first predetermined value, the loading and power control unit is activated to switch on the light-emitting unit to perform a first illumination mode to generate a first level illumination for a first predetermined time duration preset by the time setting unit, wherein when a motion intrusion signal is detected by the motion sensing unit, the loading and power control unit in response manages to increase the electric power delivered to the light-emitting unit to perform a second illumination mode to generate a second level illumination for a second predetermined time duration preset by the time setting unit, wherein the light intensity of the second level illumination is higher than the light intensity of the first level illumination, wherein when the ambient light detected by the light sensing control unit is higher than a second predetermined value, the loading and power control unit is activated to switch off the light-emitting unit;

wherein the first level illumination is a low level illumination and the second level illumination is a high level illumination, wherein during a performance of the first illumination mode, the low level illumination creates three advantages for performing a lifestyle lighting solution, wherein a first advantage is a creation of an aesthetic night scene when people are outside of a detection area of the motion sensor, wherein a second advantage is the creation of a navigation capacity similar to a light house for guiding people to safely walk to a destination in an outdoor living area, wherein a third advantage is a prevention of a hardship of light being unexpectedly and completely shutoff while a person is still in the detection space due to expiration of a timer and a simple motion by the person can immediately bring the LED security light back to the high level illumination;

wherein a configuration of the plurality of LEDs of the light-emitting unit is designed with a combination of in series and/or in parallel connections such that when incorporated with a level setting of the DC power, an electric current passing through each LED of the light-emitting unit remains at a level such that a voltage V across each LED complies with an operating constraint of $V_{th} < V < V_{max}$ featuring electrical characteristics of the LED, wherein $V_{th}$ is a threshold voltage required to trigger each LED to start emitting light and $V_{max}$ is a maximum operating voltage across each LED to avoid a thermal damage or burning out of LED construction.

80. The lifestyle LED security light according to claim 79, wherein the first LED load of the light-emitting unit is configured with a plurality of LEDs electrically connected in series or sets of in parallel connected LEDs electrically connected in series, a working voltage across the light-emitting unit is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series.

81. The lifestyle LED security light according to claim 80, wherein the LED has the voltage V across each LED complying with an operating constraint of 2.5 volts $<V_{th}<V<V_{max}<$ 3.5 volts and the working voltage imposed on the light-emitting unit represented by $V_N$ is confined in domains expressed by N×2.5 volts $<V_N<$N×3.5 volts, wherein N is the number of LEDs electrically connected in series in the first LED load of the light emitting unit.

82. The lifestyle LED security according to claim 79, wherein the power supply unit is configured with an AC/DC power converter to convert an AC power into a least one DC power required for operating the LED security light.

83. The lifestyle LED security light according to claim 79, wherein the power supply unit comprises a battery module to output at least one DC power for operating the lifestyle LED security light.

84. The lifestyle LED security light according to claim 83, wherein the battery module is a rechargeable battery module.

85. The lifestyle LED security light according to claim 84, wherein the rechargeable battery module is a solar battery module including a solar panel, a charging circuitry and a rechargeable battery.

86. The lifestyle LED security light according to claim 79, wherein a wireless remote control device is further installed and is electrically coupled with the controller, wherein the remote control device is configured with a wireless receiver and a wireless transmitter to receive a motion intrusion signal detected from a neighboring LED security light and/or to transmit the motion intrusion signal to at least one neighboring LED security light;

wherein when the motion intrusion signal is detected by the motion sensing unit, the controller synchronously operates to transmit the motion intrusion signal thru the wireless transmitter to control a lighting performance of at least one neighboring LED security light;

wherein when the motion intrusion signal detected from a neighboring LED security light is received by the wireless receiver, the controller operates to synchronously increase the conduction rate of the switching device to increase the electric power delivered to the light-emitting unit to perform the high level illumination for the second predetermined time duration.

87. The lifestyle LED security light according to claim 86, wherein the wireless signal for operating the wireless remote control device is a Wi-Fi wireless signal, a Blue Tooth wireless signal, a Zig Bee wireless signal, or a radio frequency wireless signal.

88. The lifestyle LED security light according to claim 79, wherein a second LED load to emit light with a second color temperature is further installed in the light emitting unit to be in parallel with the first LED load; wherein a light diffuser is further installed to cover the first LED load and the second LED load, wherein the first color temperature is a low color temperature and the second color temperature is a high color temperature; wherein a second semiconductor switching device and a third semiconductor switching device are further installed between the switching circuitry and the light emitting unit; wherein the second semiconductor switching device is electrically coupled between the switching circuitry and the first LED load, wherein the third semiconductor switching device is electrically coupled between the switching circuitry and the second LED load, wherein the second semiconductor switching device and the third semiconductor switching device are electrically coupled with the controller to form a power allocation circuitry for dividing the electric power from the switching circuitry into a first electric power delivered to the first LED load and a second electric power delivered to the second LED load; wherein at least one external control device operable by a user is further installed to be electrically coupled with the controller generating at least one external control signal to the controller, wherein upon receiving the at least one external control signal the controller responsively outputs at least a first control signal to control a conduction rate of the second semiconductor switching device and at least a second control signal to control the conduction rate of the third semiconductor switching device to respectively deliver the first electric power to the first LED load and the second electric power to the second LED load to generate the illumination with a mingled color temperature thru the light diffuser;

wherein for changing to a lower mingled color temperature, the controller upon receiving the at least one external control signal operates to control the second semiconductor switching device to increase the first electric power delivered to the first LED load and at the same time operates to control the third semiconductor switching device to decrease the second electric power delivered to the second LED load such that a total of the first electric power and the second electric power remains unchanged;

wherein for changing to a higher mingled color temperature, the controller upon receiving the at least one external control signal operates to control the second semiconductor switching device to decrease the first electric power delivered to the first LED load and at the same time operates to control the third semiconductor switching device to increase the second electric power delivered to the second LED load such that the total of the first electric power and the second electric power remains unchanged.

89. The lifestyle LED security light according to claim 88, wherein the controller is programmed to operate with at least one color temperature switching scheme for selecting the mingled color temperature of the first level illumination mode or the mingled color temperature of the second level illumination mode, wherein paired combinations of the first electric power delivered to the first LED load and the second electric power delivered to the second LED load for creating different mingled color temperatures are preprogrammed and stored in a memory unit addressable by the controller for operating a pick and play process according to the at least one external control signal received and interpreted by the controller for performing a selected mingled color temperature.

* * * * *

UNITED STATES PATENT AND TRADEMARK OFFICE
CERTIFICATE OF CORRECTION

PATENT NO. : 10,516,292 B2
APPLICATION NO. : 16/244671
DATED : December 24, 2019
INVENTOR(S) : Chia-Teh Chen Page 1 of 16

It is certified that error appears in the above-identified patent and that said Letters Patent is hereby corrected as shown below:

In the Claims

Column 16 Lines 29-65:
Claim 6 should read:
6. The lifestyle two-level LED security light according to claim 1, wherein the power supply unit outputs a DC power for operating the lifestyle two-level LED security light, wherein the first set of N number LEDs and the second set of M number LEDs are connected in series, wherein a constant current control circuit is connected in series with the light-emitting unit such that an electric current level remains stable in light of a drastic change of lighting load between driving the N number LEDs for generating the low level illumination and driving at least the M number LEDs for generating the high level illumination.

Claim 7 should read:
7. The lifestyle two-level LED security light according to claim 6, wherein when the lifestyle two-level LED security light is operated to generate the low level illumination, the low light intensity is further adjustable by the controller; wherein the first set of N number LEDs is configured to include a plurality of switching devices electrically coupled to the first set of N number LEDs and to the controller, wherein the controller is configured to control the number of LEDs to be turned on in the N number LEDs through bypassing unwanted LEDs in the N number LEDs respectively with the associated switching device(s) according to an external control signal played by a user or according to a value of a voltage divider set by the user.

Claim 8 should read:
8. The lifestyle two-level LED security light according to claim 6, wherein when the lifestyle two-level LED security light is operated to generate the high level illumination, the high light intensity is further adjustable by the controller, wherein the second set of M number LEDs is configured to include a plurality of switching devices electrically coupled to the second set of M number LEDs and to the controller, wherein the controller is configured to control the number of LEDs to be turned on in the M number LEDs through bypassing unwanted LEDs in the M number LEDs respectively with the Signed and Sealed this
Twentieth Day of October, 2020

Andrei Iancu
*Director of the United States Patent and Trademark Office* associated switching device(s) according to an external control signal played by a user or according to a value of a voltage divider set by the user.

Column 16 Lines 66 - Column 17 Lines 32:
Claim 9 should read:
9. The lifestyle two-level LED security light according to claim 1, wherein the power supply unit outputs at least one DC power for operating the lifestyle two-level LED security light; wherein the first set of N number LEDs and the second set of M number LEDs are connected in parallel, wherein the first switching device is electrically connected in series between the first set of N number LEDs and the power supply unit, wherein the second switching device is electrically connected in series between the second set of M number LEDs and the power supply unit.

Claim 10 should read:
10. The lifestyle two-level LED security light according to claim 9, wherein when the lifestyle two-level LED security light is operated to generate the low level illumination, the low light intensity of the low level illumination is further adjustable by the controller; wherein the controller in response to an external control signal played by a user outputs a PWM signal to control a time length of conduction period of the first switching device in each duty cycle such that an average electric current proportional to the time length of the conduction period is delivered to the light-emitting unit for performing a dimming work of the low level illumination mode.

Claim 11 should read:
11. The lifestyle two-level LED security light according to claim 9, wherein when the lifestyle two-level LED security light is operated to generate the high level illumination, the high light intensity of the high level illumination is further adjustable by the controller; wherein the controller in response to an external control signal played by a user outputs at least a PWM signal to control a time length of conduction period of at least the second switching device in each duty cycle such that an average electric current proportional to the time length of the conduction period is delivered to the light-emitting unit for performing a dimming work of the high level illumination mode.

Column 17 Lines 33-45:
Claim 12 should read:
12. The lifestyle two-level LED security light according to claim 9, wherein when the lifestyle two-level LED security light is operated to generate the high level illumination, the high light intensity of the high level illumination is further adjustable by the controller; wherein the controller in response to an external control signal played by a user outputs PWM signals to control time lengths of conduction periods of both the first switching device and the second switching device in each duty cycle such that average electric currents proportional to the time lengths of the conduction periods are delivered to the light-emitting unit for performing a dimming work of the high level illumination mode.

Column 19 Lines 38-50:
Claim 21 should read:
21. The lifestyle two-level LED security light according to claim 20, wherein when the lifestyle two-level LED security light is operated to generate the low level illumination, the low light intensity is further adjustable by the controller; wherein the first set of N number LEDs is configured to include a plurality of switching devices electrically coupled to the first set of N number LEDs and to the controller, wherein the controller is configured to control the number of LEDs to be turned on in the N number LEDs through bypassing unwanted LEDs in the N number LEDs with the associated switching device(s) according to an external control signal played by a user or according to a value of a voltage divider set by the user.

Column 19 Lines 51 - Column 20 Lines 6:
Claim 22 should read:
22. The lifestyle two-level LED security light according to claim 20, wherein when the lifestyle two-level LED security light is operated to generate the high level illumination, the high light intensity is further adjustable by the controller, wherein the second set of M number LEDs is configured to include a plurality of switching devices electrically coupled to the second set of M number LEDs and to the controller, wherein the controller is configured to control the number of LEDs to be turned on in the M number LEDs through bypassing unwanted LEDs in the M number LEDs with the associated switching device(s) according to an external control signal played by a user or according to a value of a voltage divider set by the user.

Claim 23 should read:
23. The lifestyle two-level LED security light according to claim 15, wherein the power supply unit outputs at least one DC power for operating the lifestyle two-level LED security light; wherein the first set of N number LEDs and the second set of M number LEDs are connected in parallel, wherein the first switching device is electrically connected in series between the first set of N number LEDs and the power supply unit, wherein the second switching device is electrically connected in series between the second set of M number LEDs and the power supply unit.

Column 20 Lines 43-67:
Claim 27 should read:
27. The lifestyle two-level LED security light according to claim 23, wherein when the lifestyle two-level LED security light is operated to generate the high level illumination, the high light intensity of the high level illumination is further adjustable by the controller, wherein the controller in response to an external control signal outputs PWM signals to control time lengths of conduction periods of both the first switching device and the second switching device varying with the same pace in a range for adjusting the high light intensity of the high level illumination.

Claim 28 should read:
28. The lifestyle two-level LED security light according to claim 23, wherein when the lifestyle two-level LED security light is operated to generate the low level illumination, a light color temperature of the low level illumination is further adjustable by the controller, wherein the controller in response to an external control signal outputs PWM signals to control time lengths of conduction periods of the first switching device and the second switching device to vary in a reverse manner such that a light intensity of the first set of N number LEDs with the low color temperature and a light intensity of the second set of M number LEDs with the high color temperature are reversely adjusted with the same pace to produce a variable mingled light color temperature thru the light diffuser for performing a color temperature tuning of the low level illumination.

CERTIFICATE OF CORRECTION (continued)
U.S. Pat. No. 10,516,292 B2

Column 21 Lines 1-15:
Claim 29 should read:
29. The lifestyle two-level LED security light according to claim 23, wherein when the lifestyle two-level LED security light is operated to generate the high level illumination, a light color temperature of the high level illumination is further adjustable by the controller, wherein the controller in response to an external control signal outputs PWM signals to control time lengths of conduction periods of the first switching device and the second switching device to vary in a reverse manner such that a light intensity of the first set of N number LEDs with the low color temperature and a light intensity of the second set of M number LEDs with the high color temperature are reversely adjusted with the same pace to produce a variable mingled light color temperature thru the light diffuser for performing a color temperature tuning of the high level illumination.

Column 21 Lines 16-34:
Claim 30 should read:
30. The lifestyle two-level LED security light according to claim 23, wherein when the N number LEDs and the M number LEDs are both in conduction state, a light intensity of the N number LEDs and a light intensity of the M number LEDs are respectively adjustable, wherein the controller in response to an external control signal played by a user outputs a first PWM signal to control a first conduction rate of the first switching device and a second PWM signal to control a second conduction rate of the second switching device with an arrangement that the first conduction rate of the first switching device and the second conduction rate of the second switching device are reversely adjusted with the same pace such that a total electric power level transmitted to the N number LEDs and the M number LEDs is maintained at a constant level while a mingled light color temperature of the light emitted by the N number LEDs and the light emitted by the M number LEDs thru the light diffuser is proportionately adjusted according to the external control signal to perform a color temperature tuning mode.

Column 21 Lines 35 - Column 22 Line 5:
Claim 31 should read:
31. The lifestyle two-level LED security light according to claim 23, wherein when the N number LEDs and the M number LEDs are both in conduction state, a light intensity of the N number LEDs and a light intensity of the M number LEDs are respectively adjustable, wherein the controller in response to an external control signal played by a user outputs a first PWM signal to control a first conduction rate of the first switching device and a second PWM signal to control a second conduction rate of the second switching device with an arrangement that the first conduction rate of the first switching device and the second conduction rate of the second switching device are unidirectionally and proportionally adjusted with the same pace such that a mingled light color temperature of the light emitted by the N number LEDs and the light emitted by the M number LEDs thru the light diffuser is maintained at a constant level while a light intensity of the light-emitting unit is being proportionately adjusted according to the external control signal to perform a dimming mode.

Claim 32 should read:
32. The lifestyle two-level LED security light according to claim 23, wherein when the N number LEDs and the M number LEDs are in conduction state, a light intensity and a light color temperature are both adjustable for performing a dimming and color temperature tuning control mode, wherein the controller in response to an external control signal played by a user outputs a second PWM signal to control a second conduction rate of the second switching device such that the M number LEDs with the high color temperature are dimmed according to the external control signal, wherein the controller manages to output a first PWM signal to control a first conduction state of the first switching device such that the N number LEDs with the low color temperature operates a constant power while the M number LEDs are being dimmed to create a dim to warm effect, wherein during a cycle of the dimming and color temperature tuning control mode, the light intensity and the light color temperature of the light-emitting unit are jointly determined by the external control signal.

Column 22 Lines 13-36:
Claim 34 should read:
34. The lifestyle two-level LED security light according to claim 23, wherein when the N number LEDs and the M number LEDs are in conduction state, a light intensity and a light color temperature are both adjustable for performing a dimming and color temperature tuning control mode, wherein the controller in response to an external control signal outputs a first PWM signal to control a first conduction rate of the first switching device and a second PWM signal to control a second conduction rate of the second switching device, wherein the first PWM signal and the second PWM signal are configured to operate with an arrangement that the M number LEDs and the N number LEDs are respectively dimmed in such a way that the M number LEDs leads the N number LEDs in reaching a turned off state in performing the dimming and color temperature tuning control mode such that a mingled light color temperature of the light emitted by the N number LEDs and the light emitted by the M number LEDs continues to change to a warmer illumination along with a continuous reduction of the light intensity to create a dim to warm effect according to the external control signal, wherein during a cycle of the dimming and color temperature turning control mode, the light intensity and the light color temperature of the light-emitting unit are jointly determined by the external control signal.

Column 22 Lines 37 - Column 23 Lines 6:
Claim 35 should read:
35. The lifestyle two-level LED security light according to claim 23, wherein when the N number LEDs and the M number LEDs are in conduction state, a light intensity and a light color temperature are both adjustable for performing a dimming and color temperature tuning control mode, wherein the controller in response to an external control signal outputs a first PWM signal to control a first conduction rate of the first switching device and a second PWM signal to control a second conduction rate of the second switching device, wherein the first PWM signal and the second PWM signal are configured to operate with an arrangement that the M number LEDs and the N number LEDs are respectively dimmed in such a way that the M number LEDs leads the N number LEDs in reaching a turned off state; wherein in order to accelerate color temperature tuning pace along with a continuous reduction of light intensity, the first PWM signal initially manages to increase the conduction rate of the first switching device with a pace slower than the reduction pace of the conduction rate of the second switching device such that a mingled light color temperature continues to change to a warmer illumination at a faster pace to perform a faster dim to warm process, wherein when a dim to warm process ceases at a time point when the M number LEDs reaches a turned off state is an inflection time point, the first PWM signal to reversely manage to decrease the conduction rate of the first switching device till the N number LEDs reaching the turned off state in performing the dimming and color temperature tuning control mode such that the mingled light color temperature of the light emitted by the N number LEDs and the light emitted by the M number LEDs continues to change to a warmer illumination along with a continuous reduction of light intensity to create a dim to warm effect

CERTIFICATE OF CORRECTION (continued)
U.S. Pat. No. 10,516,292 B2 according to the external control signal, wherein during a cycle of the dimming and color temperature turning control mode, the light intensity and the light color temperature of the light-emitting unit are jointly determined by the external control signal.

Column 23 Lines 33 - Column 24 Lines 2:
Claim 38 should read:
38. A two-level LED security light comprising: a light-emitting unit; a loading and power control unit; a light sensing control unit; a power supply unit; and at least one external control unit; wherein the light-emitting unit comprises a plurality of LEDs divided into two sets of LEDs with a first set of N number LEDs emitting light with a low color temperature and a second set of M number LEDs emitting light with a high color temperature, wherein N and M are positive integers; wherein the first set of N number LEDs and the second set of M number LEDs are covered by a light diffuser to create a diffused light; wherein the loading and power control unit comprises a controller and a switching circuitry, wherein the controller is electrically coupled to the light sensing control unit, the switching circuitry and the at least one external control unit; wherein the switching circuitry is electrically coupled between at least one power source of the power supply unit and the light-emitting unit; wherein the switching circuitry is controlled by the controller to perform at least respectively a first switching mode and a second switching mode according to signals respectively received from the light sensing control unit and the at least one external control unit; wherein in the first switching mode at least the first set of N number LEDs in the light-emitting unit is turned on to perform a first illumination mode and in the second switching mode at least the second set of M number LEDs in the light-emitting unit is turned on to perform a second illumination mode; wherein when an ambient light detected by the light sensing control unit is lower than a first predetermined value, the loading and power control unit manages to perform at least one of the first illumination mode and the second illumination mode;

Column 25 Lines 15-37:
Claim 43 should read:
43. The two-level LED security light according to claim 38, wherein the at least one external control unit is a power interruption detection circuitry electrically coupled to the controller for detecting a short power interruption signal; wherein when the short power interruption signal is detected, the controller operates to alternately perform at least one of a first illumination mode, a second illumination mode and a third illumination mode; wherein when the first illumination mode is performed, the loading and power control unit manages to turn on only the first set of N number LEDs in the light-emitting unit to perform the low level illumination mode emitting light with the low color temperature, wherein when the second illumination mode is performed, the loading and power control unit manages to turn on only the second set of M number LEDs in the light-emitting unit to perform the high level illumination mode emitting light with the high color temperature; wherein when the third illumination mode is performed, the loading and power control unit manages to reduce a first light intensity of the first set of N number LEDs in the light-emitting unit and a second light intensity of the second set of M number LEDs in the light-emitting unit respectively with the same pace such that the light-emitting unit accordingly performs a medium mingled light color temperature.

Column 25 Lines 43-45:
Claim 44 should read:
a diffuser covering the first LED load and the second LED load to create a diffused light with a mingled light color temperature;

Column 26 Lines 1-9:
Claim 44 should read:
delivering different electric powers from the power source respectively to the first LED load and the second LED load of the light-emitting unit such that the light-emitting unit respectively generates illuminations of different light intensities and different mingled light color temperatures for performing different illumination modes according to signals respectively received from the light sensing control unit, the motion sensing unit and the at least one external control unit;

Column 26 Lines 14-19:
Claim 44 should read:
wherein the controller outputs at least a first control signal to control at least a first conduction rate of the switching circuitry such that a low electric power is delivered to the light-emitting unit to perform a low level illumination mode emitting light with a low light intensity and a low mingled light color temperature;

Column 26 Lines 24-43:
Claim 44 should read:
wherein when a motion signal is detected by the motion sensing unit, at least the second LED load is switched on by the loading and power control unit, wherein the controller outputs at least a second control signal to control at least a second conduction rate of the switching circuitry such that a high electric power is delivered to the light-emitting unit to perform a high level illumination mode emitting light with a high light intensity and a high mingled light color temperature for a predetermined time duration before switching back to the low level illumination mode; wherein the at least one external control unit generates at least one external control signal for adjusting or selecting at least one operating parameter including the light intensity of the low level illumination mode and the mingled light color temperature of the low level illumination mode, the light intensity of the high level illumination mode, the mingled light color temperature of the high level illumination mode and a time length of the predetermined time duration;

Column 27 Lines 15-40:
Claim 47 should read:
47. The two-level LED security light according to claim 44, wherein when the light-emitting unit is operated in the low level illumination mode, the light intensity of the first LED load and the light intensity of the second LED load are respectively adjustable to tune the mingled light color temperature of the diffused light created thru the light diffuser; wherein upon receiving the at least one external control signal from the at least one external control unit the controller operates in response to simultaneously but reversely adjust the light intensity of the first LED load and the light intensity of the second LED load with the same pace; wherein for changing to a lower mingled
light color temperature, the controller upon receiving the at least one external control signal operates to control the switching circuitry to increase a first electric power delivered to the first LED load and at the same time to decrease a second electric power delivered to the second LED lighting load;

wherein for changing to a higher mingled light color temperature, the controller upon receiving the external control signal operates to control the switching circuitry to decrease the first electric power delivered to the first LED lighting load and at the same time to increase the second electric power delivered to the second LED lighting load such that a sum of the first electric power and the second electric power remains unchanged and is equal to the low electric power in the low level illumination mode.

Column 27 Lines 41-67:
Claim 48 should read:
48. The two-level LED security light according to claim 44, wherein when the light-emitting unit is operated in the high level illumination mode, the light intensity of the first LED load and the light intensity of the second LED load are respectively adjustable to tune the mingled light color temperature of the diffused light created thru the light diffuser; wherein upon receiving the at least one external control signal from the at least one external control unit the controller operates in response to simultaneously but reversely adjust the light intensity of the first LED load and the light intensity of the second LED load with the same pace; wherein for changing to a lower mingled light color temperature, the controller upon receiving the at least one external control signal operates to control the switching circuitry to increase a first electric power delivered to the first LED load and at the same time to decrease a second electric power delivered to the second LED load such that a sum of the first electric power and the second electric power remains unchanged; wherein for changing to a higher mingled light color temperature, the controller upon receiving the external control signal operates to control the switching circuitry to decrease the first electric power delivered to the first LED load and at the same time to increase the second electric power delivered to the second LED load such that the sum of the first electric power and the second electric power remains unchanged and is equal to the high electric power in the high level illumination mode.

Column 28 Lines 1-22:
Claim 49 should read:
49. The two-level LED security light according to claim 44, wherein the controller is programmed to operate with at least one color temperature switching scheme for selecting the mingled light color temperature of the low level illumination mode or the mingled light color temperature of the high level illumination mode, wherein paired combinations of different conduction rates of the switching circuitry for controlling different electric powers to be respectively delivered to the first LED load and the second LED load for creating different mingled light color temperatures are preprogrammed and stored in a memory unit addressable by the controller for operating a pick and play process according to the at least one external control signal received and interpreted by the controller for performing a selected mingled light color temperature; wherein in programming the paired combinations of different conduction rates of the switching circuitry, a first electric power delivered to the first LED load and a second electric power delivered to the second LED load are complementarily and reversely adjusted such that a total of the first electric power delivered to the first LED load and the second electric power delivered to the second LED load remain essentially unchanged.

Column 28 Lines 23-28:
Claim 50 should read:
50. The two-level LED security light according to claim 49, wherein the at least one external control unit includes at least one voltage divider and the at least one external control signal is a voltage output of the voltage divider set by a user, for selecting a color temperature performance of the at least one color temperature switching scheme.

Column 28 Lines 29-38:
Claim 51 should read:
51. The two-level LED security light according to claim 49, wherein the at least one external control unit includes at least one push button or one touch pad and the at least one external control signal is a short voltage signal with a time length corresponding to a time duration of the push button or the touch pad being operated by a user, wherein upon receiving the short voltage signal the controller operates the pick and play process to alternately perform the selected mingled light color temperature in the at least one color temperature switching scheme according to a preset sequence.

Column 28 Lines 43-58:
Claim 53 should read:
53. The two-level LED security light according to claim 49, wherein in tuning the mingled light color temperature the controller operates to simultaneously but reversely adjust the light intensity of the first LED load and the light intensity of the second LED load with an arrangement that a total electric power of the light-emitting unit is kept essentially unchanged during adjusting process.

Claim 54 should read:
54. The two-level LED security light according to claim 49, wherein the at least one external control unit is a power interruption detection circuitry electrically coupled to the controller for detecting a short power interruption signal; wherein when the short power interruption signal is detected, the controller operates to alternately switch a selection of different mingled light color temperatures according to the at least one color temperature switching scheme preprogrammed.

Column 28 Lines 64-66:
Claim 55 should read:
a diffuser covering the first LED load and the second LED load to create a diffused light with a mingled light color temperature;

Column 29 Lines 31-33:
Claim 55 should read:
light-emitting unit respectively generates illuminations of different light intensities and different mingled light color temperatures for performing different illumination Column 29 Lines 42-49:
Claim 55 should read:
wherein the controller outputs at least the first control signal to control at least the first conduction rate of at least the first semiconductor switching device such that a total electric power is delivered to the light-emitting unit to perform the first illumination mode with a first level illumination characterized by a first light intensity and a first mingled light color temperature for a first predetermined time duration;

Column 29 Lines 55-67:
Claim 55 should read:
wherein when a motion signal is detected by the motion sensing unit, the controller operates to output at least the second control signal to control at least the second conduction rate of at least the second semiconductor switching device to increase the total electric power delivered to the light-emitting unit to perform a second illumination mode with a second level illumination characterized by a second light intensity and a second mingled light color temperature for a second predetermined time duration before being switched back to the turned off state, wherein the second light intensity of the second level illumination is equal to or higher than the first light intensity of the first level illumination;

Column 30 Lines 10-15:
Claim 55 should read:
the light intensity, the mingled light color temperature, a time length for the first predetermined time duration or a time length for the second predetermined time duration respectively in the first illumination mode or in the second illumination mode;

Column 30 Lines 31-43:
Claim 56 should read:
56. The lifestyle LED security light according to claim 55, wherein when each of the first LED load and the second LED load is configured with a plurality of LEDs electrically connected in series or sets of in parallel connected LEDs electrically connected in series, a working voltage across the first LED load or the second LED load is confined in a domain between a minimum voltage equal to the sum of the threshold voltages of all LEDs electrically connected in series or sets of in parallel connected LEDs electrically connected in series and a maximum voltage equal to the sum of the maximum voltages of all LEDs electrically connected in series or sets of in parallel connected LEDs electrically connected in series.

Column 30 Lines 55 - Column 31 Lines 7:
Claim 58 should read:
58. The lifestyle LED security light according to claim 55, wherein the first mingled light color temperature of the first level illumination in performing the first illumination mode is the low color temperature, wherein the second semiconductor switching device is in a cutoff state and the controller outputs only the first control signal to control the first conduction rate of the first semiconductor switching device to deliver the total electric power to the light-emitting unit to determine the light intensity of the first illumination mode.

Claim 59 should read:
59. The lifestyle LED security light according to claim 55, wherein the second mingled light color temperature of the second level illumination in performing the second illumination mode is the high color temperature, wherein the first semiconductor switching device is in a cutoff state and the controller outputs only the second control signal to control the second conduction rate of the second semiconductor switching device to deliver the total electric power to the light-emitting unit to determine the light intensity of the second illumination mode.

Column 31 Lines 8-31:
Claim 60 should read:
60. The lifestyle LED security light according to claim 55, wherein when the light-emitting unit is in the first illumination mode, a light intensity of the first LED load and a light intensity of the second LED load are respectively adjustable to tune the mingled light color temperature of the diffused light created thru the light diffuser; wherein upon receiving an external control signal from the external control unit the controller operates to simultaneously but reversely adjust the light intensity of the first LED load and the light intensity of the second LED load with the same pace; wherein for changing to a lower mingled light color temperature, the controller upon receiving the external control signal operates to control the first semiconductor switching device to increase the first electric power delivered to the first LED load and at the same time operates to control the second semiconductor switching device to proportionally decrease the second electric power delivered to the second LED load; wherein for changing to a higher mingled light color temperature, the controller upon receiving the external control signal operates to control the first semiconductor switching device to decrease the first electric power delivered to the first LED load and at the same time operates to control the second semiconductor switching device to proportionally increase the second electric power delivered to the second LED load.

Column 31 Lines 32-46:
Claim 61 should read:
61. The lifestyle LED security light according to claim 60, wherein when the light-emitting unit is in the first illumination mode, the controller is programmed to operate with a color temperature switching scheme, wherein paired combinations of different conduction rates between operating the first semiconductor switching device and the second semiconductor switching device for controlling the first electric power and the second electric power respectively delivered to the first LED load and the second LED load for creating different mingled light color temperatures are preprogrammed and stored in a memory unit addressable by the controller for operating a pick and play process according to the at least one external control signal received and interpreted by the controller for performing a selected mingled light color temperature.

Column 31 Lines 47 - Column 32 Lines 3:
Claim 62 should read:
62. The lifestyle LED security light according to claim 55, wherein when the light-emitting unit is in the second illumination mode, the light intensity of the first LED load and the light intensity of the second LED load are respectively adjustable to tune the mingled light color temperature thru the light diffuser; wherein upon receiving an external control signal from the at least one external control unit the controller operates to simultaneously but reversely adjust the light intensity of the first LED load and the light intensity of the second LED load with the same pace; wherein for changing to a lower mingled light color temperature, the controller upon receiving the external control signal operates to control the first semiconductor switching device to increase the first electric power delivered to the first LED load and at the same time operates to control the second semiconductor switching device to proportionally decrease the second electric power delivered to the second LED load; wherein for changing to a higher mingled light color temperature, the controller upon receiving the external control signal operates to control the first semiconductor switching device to decrease the first electric power delivered to the first LED load and at the same time operates to control the second semiconductor switching device to proportionally increase the second electric power delivered to the second LED load.

Column 32 Lines 4-32:
Claim 63 should read:
63. The lifestyle LED security light according to claim 62, wherein when the light-emitting unit is in the second illumination mode, the controller is programmed to operate with a color temperature switching scheme, wherein paired combinations of different conduction rates between operating the first semiconductor switching device and the second semiconductor switching device for controlling the first electric power and the second electric power to be respectively delivered to the first LED load and the second LED load for creating different mingled light color temperatures are preprogrammed and stored in a memory unit addressable by the controller for operating a pick and play process according to the external control signal received and interpreted by the controller for performing a selected mingled light color temperature.

Claim 64 should read:
64. The lifestyle LED security light according to claim 61, wherein the at least one external control unit includes at least one voltage divider and the at least one external control signal is a voltage output of the voltage divider set by a user, for activating the pick and play process for selecting a corresponding mingled light color temperature performance in the color temperature switching scheme.

Claim 65 should read:
65. The lifestyle LED security light according to claim 63, wherein the at least one external control unit includes at least one voltage divider and the at least one external control signal is a voltage output of the voltage divider set by a user, for activating the pick and play process for selecting a corresponding mingled light color temperature performance in the color temperature switching scheme.

Column 32 Lines 33-40:
Claim 66 should read:
66. The lifestyle LED security light according to claim 61, wherein the at least one external control unit includes at least one wireless signal receiver to receive a wireless external control signal from a mobile device, a smart phone or a smart speaker for activating the pick and play process for selecting a corresponding mingled light color temperature performance in the color temperature switching scheme.

Column 32 Lines 46-48:
Claim 67 should read:
a diffuser covering the first LED load and the second LED load to create a diffused light with a mingled light color temperature;

Column 33 Lines 13-18:
Claim 67 should read:
light-emitting unit respectively generates illuminations of different light intensities and different mingled light color temperatures for performing different illumination modes according to signals respectively received from the light sensing control unit, the motion sensing unit and the at least one external control unit;

Column 33 Lines 29-31:
Claim 67 should read:
characterized by a first light intensity and a first mingled light color temperature for a first predetermined time duration;

Column 33 Lines 45-52:
Claim 67 should read:
characterized by a second light intensity and a second mingled light color temperature for a second predetermined time duration before being switched back to the low level illumination, wherein the second light intensity of the second level illumination is equal to or higher than the first light intensity of the first level illumination, wherein the first light intensity is equal to or higher than the low light intensity of the low level illumination;

Column 33 Lines 57-67:
Claim 67 should read:
wherein the at least one external control unit is a voltage divider, a push button, a touch pad, a wireless signal receiver or a power interruption detection circuitry, generating at least one external control signal for adjusting or selecting at least one operating parameter of the light-emitting unit including the light intensity, the mingled light color temperature, a time length for the first predetermined time duration or a time length for the second predetermined time duration respectively in the first illumination mode or in the second illumination mode;

Column 34 Lines 39-57:
Claim 70 should read:
70. The lifestyle LED security light according to claim 67, wherein the first mingled light color temperature in performing the first illumination mode is the low color temperature, wherein the second semiconductor switching device is in a cutoff state and the controller outputs only the first control signal to control the first conduction rate of the first semiconductor switching device to deliver the total electric power to the light-emitting unit to determine the light intensity and the first mingled light color temperature of the first illumination mode.

Claim 71 should read:
71. The lifestyle LED security light according to claim 67, wherein the second mingled light color temperature in performing the second illumination mode is the high color temperature, wherein the first semiconductor switching device is in a cutoff state and the controller outputs only the second control signal to control the second conduction rate of the second semiconductor switching device to deliver the total electric power to the light-emitting unit to determine the light intensity of the second illumination mode.

Column 34 Lines 58 - Column 35 Lines 13:
Claim 72 should read:
72. The lifestyle LED security light according to claim 67, wherein when the light-emitting unit is in the first illumination mode, a light intensity of the first LED lighting load and a light intensity of the second LED lighting load are respectively adjustable to tune the mingled light color temperature of the diffused light thru the light diffuser; wherein upon receiving an external control signal from the at least one external control unit the controller operates to simultaneously but reversely adjust the light intensity of the first LED lighting load and the light intensity of the second LED lighting load with the same pace; wherein for changing to a lower mingled light color temperature, the controller upon receiving the external control signal operates to control the first semiconductor switching device to increase the first electric power delivered to the first LED load and at the same time proportionally decrease the second electric power delivered to the second LED load; wherein for changing to a higher mingled light color temperature, the controller upon receiving the external control signal operates to control the first semiconductor switching device to decrease the first electric power delivered to the first LED load and at the same time proportionally increase the second electric power delivered to the second LED load.

Column 35 Lines 14-52:
Claim 73 should read:
73. The lifestyle LED security light according to claim 72, wherein when the light-emitting unit is in the first illumination mode, the controller is programmed to operate with a color temperature switching scheme, wherein paired combinations of different conduction rates between operating the first semiconductor switching device and the second semiconductor switching device for controlling the first electric power and the second electric power respectively delivered to the first LED load and the second LED load for creating different mingled light color temperatures are preprogrammed and stored in a memory unit addressable by the controller for operating a pick and play process according to the external control signal received and interpreted by the controller for performing a selected mingled light color temperature.

Claim 74 should read:
74. The lifestyle LED security light according to claim 67, wherein when the light-emitting unit is in the second illumination mode, a light intensity of the first LED lighting load and a light intensity of the second LED lighting load are respectively adjustable to tune the mingled light color temperature thru the light diffuser; wherein upon receiving an external control signal from the at least one external control unit the controller operates to simultaneously but reversely adjust the light intensity of the first LED lighting load and the light intensity of the second LED lighting load with the same pace; wherein for changing to a lower mingled light color temperature, the controller upon receiving the external control signal operates to control the first semiconductor switching device to increase the first electric power delivered to the first LED load and at the same time operates to control the second semiconductor switching device to proportionally decrease the second electric power delivered to the second LED load; wherein for changing to a higher mingled light color temperature, the controller upon receiving the external control signal operates to control the first semiconductor switching device to decrease the first electric power delivered to the first LED load and at the same time operates to control the second semiconductor switching device to proportionally increase the second electric power delivered to the second LED load.

Column 35 Lines 53 - Column 36 Lines 7:
Claim 75 should read:
75. The lifestyle LED security light according to claim 74, wherein when the light-emitting unit is in the second illumination mode, the controller is programmed to operate with a color temperature switching scheme, wherein paired combinations of different conduction rates between operating the first semiconductor switching device and the second semiconductor switching device for controlling the first electric power and the second electric power respectively delivered to the first LED load and the second LED load for creating different mingled light color temperatures are preprogrammed and stored in a memory unit addressable by the controller for operating a pick and play process according to the external control signal received and interpreted by the controller for performing a selected mingled light color temperature.

Claim 76 should read:
76. The lifestyle LED security light according to claim 73, wherein the at least one external control unit includes at least one voltage divider and the at least one external control signal is a voltage output of the voltage divider set by a user, for activating the pick and play process for selecting a corresponding mingled light color temperature performance in the color temperature switching scheme.

Column 36 Lines 8-22:
Claim 77 should read:
77. The lifestyle LED security light according to claim 75, wherein the at least one external control unit includes at least one voltage divider and the at least one external control signal is a voltage output of the voltage divider set by a user, for activating the pick and play process for selecting a corresponding mingled light color temperature performance in the color temperature switching scheme.

Claim 78 should read:
78. The lifestyle LED security light according to claim 73, wherein the at least one external control unit include at least one wireless signal receiver to receive a wireless external control signal from a mobile device, a smart phone or a smart speaker for activating the pick and play process for selecting a corresponding mingled light color temperature performance in the color temperature switching scheme.

Column 37 Lines 57-59:
Claim 81 should read:
volts, wherein N is the number of LEDs electrically connected in series in the first LED load of the light-emitting unit.

Column 37 Lines 60-63:
Claim 82 should read:
82. The lifestyle LED security light according to claim 79, wherein the power supply unit is configured with an AC/DC power converter to convert an AC power into at least one DC power required for operating the lifestyle LED security light.

Column 38 Lines 34-44:
Claim 88 should read:
88. The lifestyle LED security light according to claim 79, wherein a second LED load to emit light with a second color temperature is further installed in the light-emitting unit to be in parallel with the first LED load; wherein a light diffuser is further installed to cover the first LED load and the second LED load, wherein the first color temperature is a low color temperature and the second color temperature is a high color temperature; wherein a second semiconductor switching device and a third semiconductor switching device are further installed between the switching circuitry and the light-emitting unit;

Column 38 Lines 59-67:
Claim 88 should read:
at least one external control signal the controller responsively outputs at least a first control signal to control a conduction rate of the second semiconductor switching device and at least a second control signal to control the conduction rate of the third semiconductor switching device to respectively deliver the first electric power to the first LED load and the second electric power to the second LED load to generate the illumination with a mingled light color temperature thru the light diffuser;

Column 39 Lines 1-11:
Claim 88 should read:
wherein for changing to a lower mingled light color temperature, the controller upon receiving the at least one external control signal operates to control the second semiconductor switching device to increase the first electric power delivered to the first LED load and at the same time operates to control the third semiconductor switching device to decrease the second electric power delivered to the second LED load such that a total of the first electric power and the second electric power remains unchanged;

Column 39 Lines 12 - Column 40 Lines 3:
Claim 88 should read:
wherein for changing to a higher mingled light color temperature, the controller upon receiving the at least one external control signal operates to control the second semiconductor switching device to decrease the first electric power delivered to the first LED load and at the same time operates to control the third semiconductor switching device to increase the second electric power delivered to the second LED load such that the total of the first electric power and the second electric power remains unchanged.

Column 40 Lines 4-17:
Claim 89 should read:
89. The lifestyle LED security light according to claim 88, wherein the controller is programmed to operate with at least one color temperature switching scheme for selecting the mingled light color temperature of the first illumination mode or the mingled light color temperature of the second illumination mode, wherein paired combinations of the first electric power delivered to the first LED load and the second electric power delivered to the second LED load for creating different mingled light color temperatures are preprogrammed and stored in a memory unit addressable by the controller for operating a pick and play process according to the at least one external control signal received and interpreted by the controller for performing a selected mingled light color temperature.